US012666053B2

(12) United States Patent
Choi et al.

(10) Patent No.: US 12,666,053 B2
(45) Date of Patent: * Jun. 23, 2026

(54) VIDEO DECODING METHOD AND APPARATUS, AND VIDEO ENCODING METHOD AND APPARATUS

(71) Applicant: SAMSUNG ELECTRONICS CO., LTD., Suwon-si (KR)

(72) Inventors: Woongil Choi, Suwon-si (KR); Minsoo Park, Suwon-si (KR); Minwoo Park, Suwon-si (KR); Seungsoo Jeong, Suwon-si (KR); Kiho Choi, Suwon-si (KR); Narae Choi, Suwon-si (KR); Anish Tamse, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/782,947

(22) Filed: Jul. 24, 2024

(65) Prior Publication Data

US 2024/0380898 A1     Nov. 14, 2024

Related U.S. Application Data

(63) Continuation of application No. 17/573,181, filed on Jan. 11, 2022, now Pat. No. 12,081,772, which is a
(Continued)

(51) Int. Cl.
*H04N 19/174*        (2014.01)
*H04N 19/117*        (2014.01)
(Continued)

(52) U.S. Cl.
CPC ......... *H04N 19/174* (2014.11); *H04N 19/117* (2014.11); *H04N 19/176* (2014.11); *H04N 19/60* (2014.11); *H04N 19/82* (2014.11)

(58) Field of Classification Search
CPC .. H04N 19/117; H04N 19/174; H04N 19/176; H04N 19/60; H04N 19/82
(Continued)

(56) References Cited

U.S. PATENT DOCUMENTS 10,250,879 B2    4/2019  Kim et al.
11,272,175 B2    3/2022  Wang et al.
(Continued)

FOREIGN PATENT DOCUMENTS

CN        103238318 A    8/2013
CN        103959794 A    7/2014
(Continued)

OTHER PUBLICATIONS

Communication issued on Jun. 26, 2024 by the China National Intellectual Property Administration for Chinese Patent Application No. 202080050565.4.
(Continued)

*Primary Examiner* — Asmamaw G Tarko
(74) *Attorney, Agent, or Firm* — Sughrue Mion, PLLC

(57) ABSTRACT

A video decoding method including reconstructing a current block comprising a current pixel via a prediction and an inverse transformation. The method including obtaining, from a bitstream, information indicating whether an in-loop filtering by using at least one pixel located outside a boundary of a current slice is applicable. The method including padding a value of the first adjacent pixel as a value of a second adjacent pixel. The method including determining filter coefficients corresponding to locations of third adjacent pixels used for an adaptive loop filter (ALF) of the current pixel based on a value of the current pixel and values of the third adjacent pixels. The method including obtaining a value of a filtered current pixel by adding the value of the current pixel.

4 Claims, 24 Drawing Sheets

BITSTREAM

OUTPUT IMAGE

Related U.S. Application Data continuation of application No. PCT/KR2020/009085, filed on Jul. 10, 2020.

(60) Provisional application No. 62/872,811, filed on Jul. 11, 2019.

(51) Int. Cl.
  *H04N 19/176* (2014.01)
  *H04N 19/60* (2014.01)
  *H04N 19/82* (2014.01)

(58) Field of Classification Search
  USPC ........................................................ 375/240
  See application file for complete search history.

(56) References Cited

U.S. PATENT DOCUMENTS

| | | | | |
|---|---|---|---|---|
| 11,589,042 | B2 * | 2/2023 | Zhang | ................... H04N 19/96 |
| 2012/0106624 | A1 | 5/2012 | Huang et al. | |
| 2013/0101016 | A1 | 4/2013 | Chong et al. | |
| 2013/0128986 | A1 * | 5/2013 | Tsai | ....................... H04N 19/82 |
| | | | | 375/E7.193 |
| 2013/0272624 | A1 | 10/2013 | Budagavi | |
| 2013/0343447 | A1 | 12/2013 | Chen et al. | |
| 2014/0003496 | A1 | 1/2014 | Kondow | |
| 2014/0198844 | A1 | 7/2014 | Hsu et al. | |
| 2014/0219337 | A1 | 8/2014 | Lee et al. | |
| 2014/0286396 | A1 | 9/2014 | Lee et al. | |
| 2016/0277762 | A1 | 9/2016 | Zhang et al. | |
| 2017/0359595 | A1 | 12/2017 | Zhang et al. | |
| 2018/0199034 | A1 | 7/2018 | Nam et al. | |
| 2019/0124327 | A1 | 4/2019 | Kawai et al. | |
| 2020/0120359 | A1 | 4/2020 | Hanhart et al. | |
| 2021/0014537 | A1 | 1/2021 | Hu et al. | |
| 2022/0132117 | A1 * | 4/2022 | Zhang | .................. H04N 19/117 |
| 2022/0191531 | A1 * | 6/2022 | Sim | ...................... H04N 19/124 |

FOREIGN PATENT DOCUMENTS

| | | | |
|---|---|---|---|
| CN | 104702963 A | 6/2015 | |
| CN | 106716997 A | 5/2017 | |
| CN | 109600611 A | 4/2019 | |
| CN | 109792541 A | 5/2019 | |
| EP | 3997884 | 5/2022 | |
| JP | 2012-213128 A | 11/2012 | |
| KR | 10-2013-0034614 A | 4/2013 | |
| KR | 10-2019-0003497 A | 1/2019 | |
| KR | 10-2019-0057910 A | 5/2019 | |
| WO | 2019/089695 A1 | 5/2019 | |
| WO | 2021007252 A1 | 1/2021 | |

OTHER PUBLICATIONS

Benjamin Bross et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v10 (Jul. 2, 2019), pp. 306-314 (20 total pages).

Communication issued May 11, 2022 by the Indian Patent Office in Indian Patent Application No. 202247004489.

Communication issued on Jan. 8, 2024 by the Indonesian Patent Office for Indonesian Patent Application No. P00202200902.

Communication issued on Jan. 30, 2024 by the China National Intellectual Property Administration for Chinese Patent Application No. 202080050565.4.

Extended European Search Report dated May 8, 2023, issued by European Patent Office in European Patent Application 20837156.7.

Liu, Hongbin et al., "Non-CE5: Suggested text changes for ALF padding process", Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P1038.

International Search Report (PCT/ISA/210) and Written Opinion (PCT/ISA/237) issued Oct. 15, 2020 by the International Searching Authority in counterpart International Patent Application No. PCT/KR2020/009085.

Communication issued Sep. 12, 2024 by the Intellectual Property Office of Australia in Australian Patent Application No. 2023270341.

Communication issued Oct. 11, 2024 by the National Intellectual Property Administration, PRC in Chinese Patent Application No. 202080050565.4.

Communication dated Nov. 3, 2025 issued by the Korean Ministry of Intellectual Property in counterpart Korean Patent Application No. 10-2022-7000730.

Communication dated DecemberApplication No. 20837156.7.

Eselink et al., "AHG6: Modification to loop filtering across slice boundaries," Joint Collaborative Team on Video Coding (JCT-VC) of ITU-T SG16 WP3 and ISO/IEC JTC1/SC29/WG11, Jul. 2012, XP030234608, URL:http://phenix.intevry.fr/jct/doc_end_user/documents/10_Stockholm/wg11/JCTVC-J0266-v2.zip JCTVC-J0266_r1.docx, Total 8 pages.

Chen et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11, Mar. 2019, XP030222341, URL:http://phenix.int-evry.fr/mpeg/doc_end_user/documents/126_Geneva/wg11/w18371.zip w18371.docx, Total 77 pages.

* cited by examiner

BITSTREAM

OUTPUT IMAGE

FIG. 4
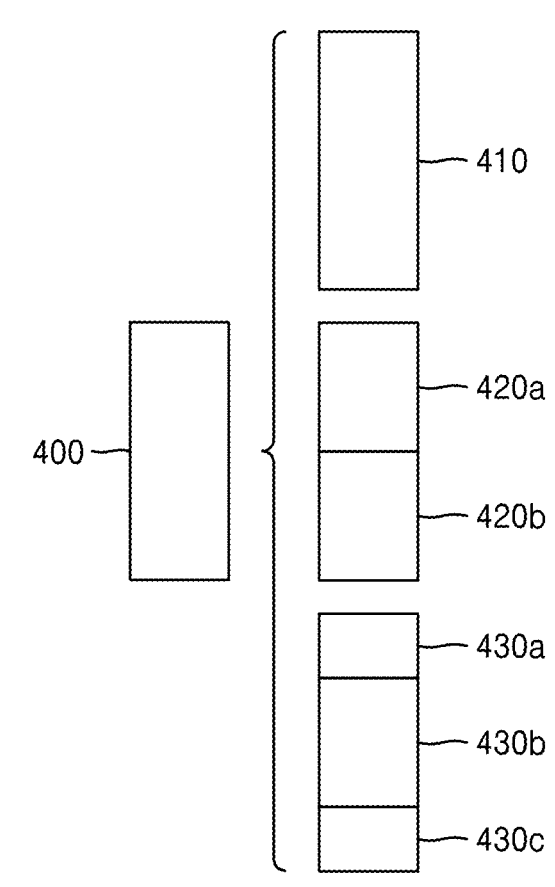
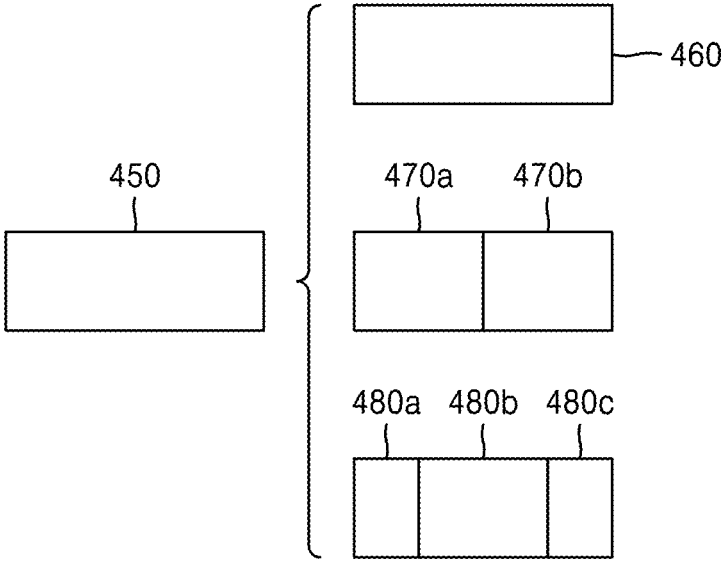

FIG. 6
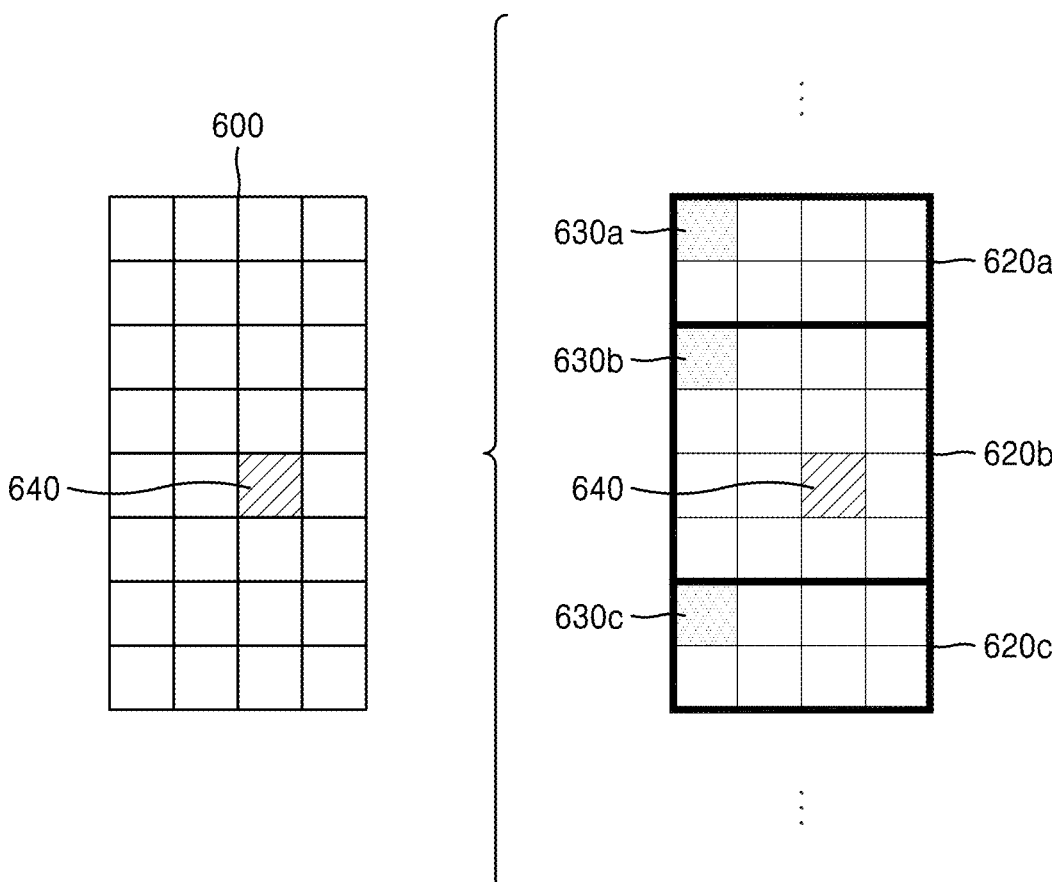
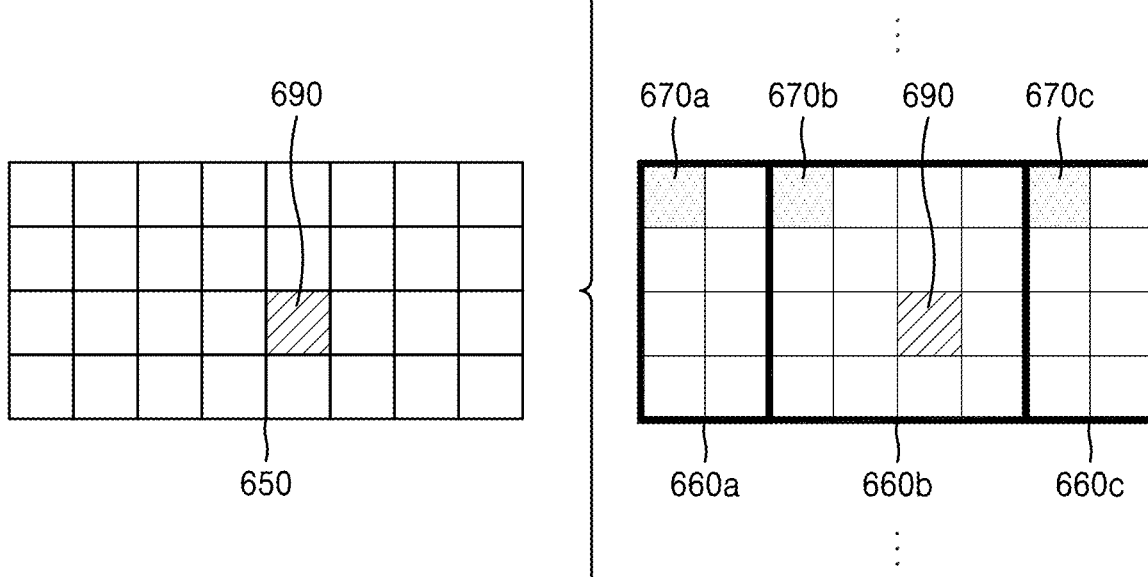

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 14

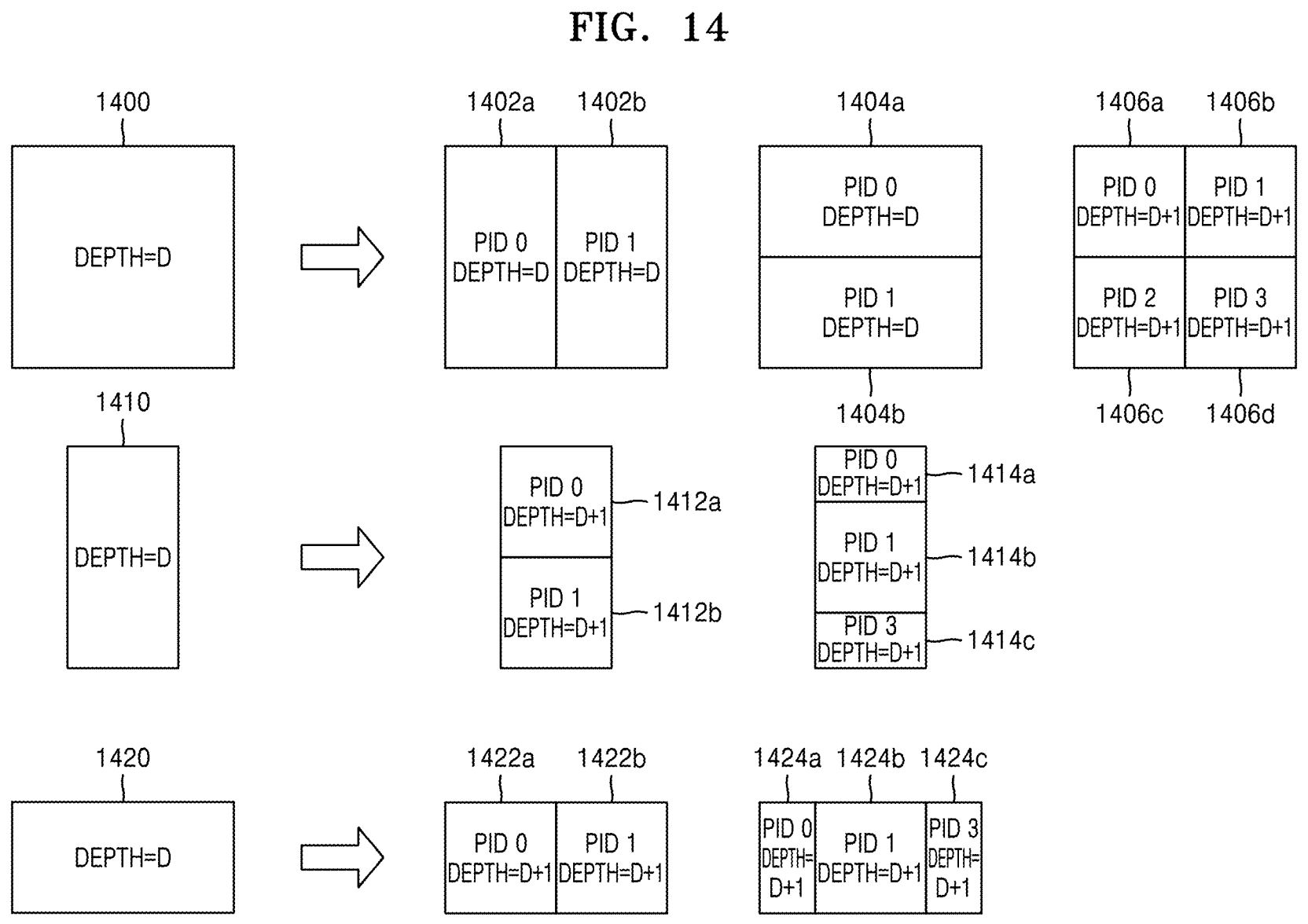

1400 — DEPTH=D

⇒

1402a — PID 0 DEPTH=D
1402b — PID 1 DEPTH=D

1404a — PID 0 DEPTH=D
1404b — PID 1 DEPTH=D

1406a — PID 0 DEPTH=D+1
1406b — PID 1 DEPTH=D+1
1406c — PID 2 DEPTH=D+1
1406d — PID 3 DEPTH=D+1

1410 — DEPTH=D

⇒

1412a — PID 0 DEPTH=D+1
1412b — PID 1 DEPTH=D+1

1414a — PID 0 DEPTH=D+1
1414b — PID 1 DEPTH=D+1
1414c — PID 3 DEPTH=D+1

1420 — DEPTH=D

⇒

1422a — PID 0 DEPTH=D+1
1422b — PID 1 DEPTH=D+1

1424a — PID 0 DEPTH=D+1
1424b — PID 1 DEPTH=D+1
1424c — PID 3 DEPTH=D+1

FIG. 18

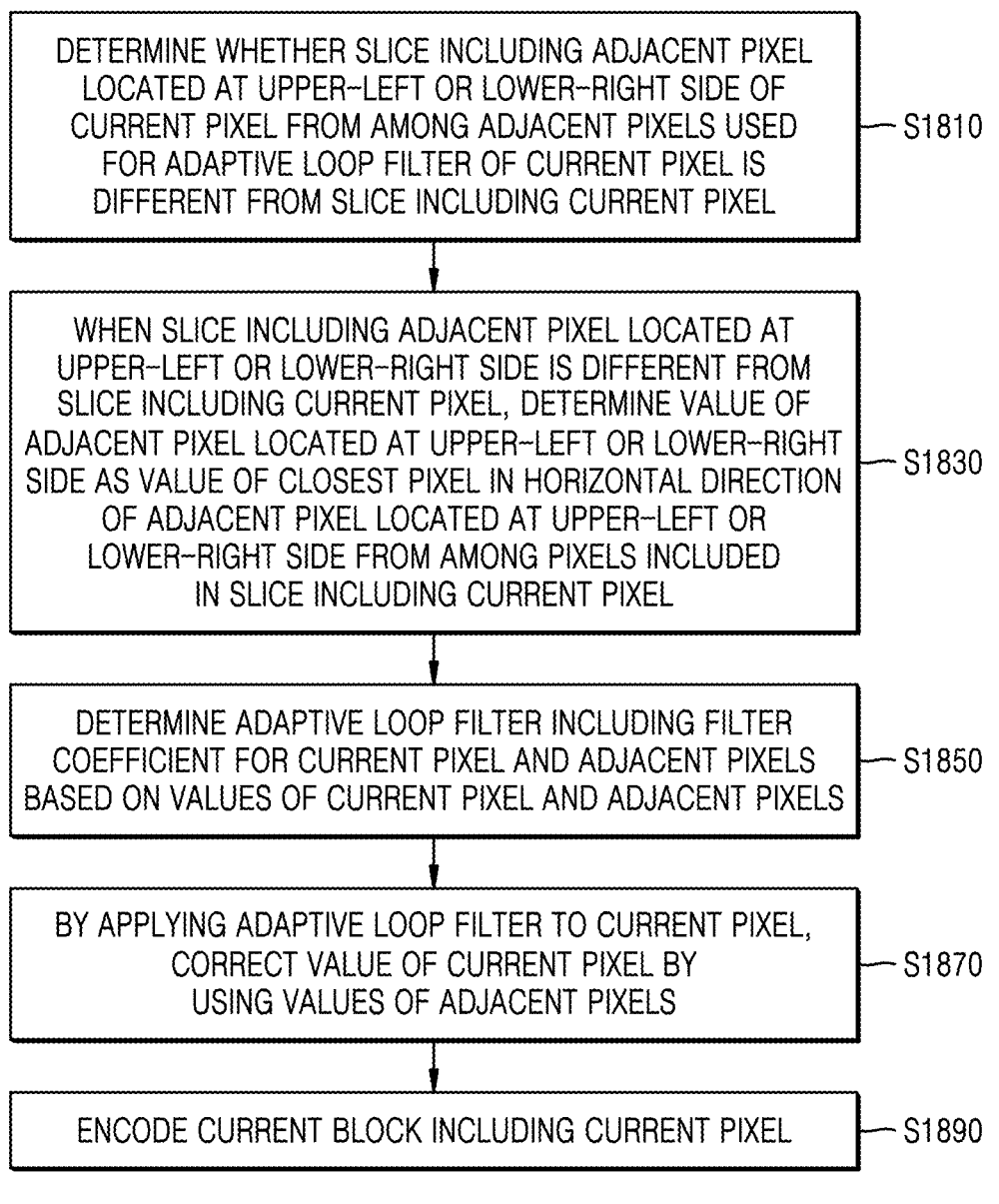

DETERMINE WHETHER SLICE INCLUDING ADJACENT PIXEL LOCATED AT UPPER-LEFT OR LOWER-RIGHT SIDE OF CURRENT PIXEL FROM AMONG ADJACENT PIXELS USED FOR ADAPTIVE LOOP FILTER OF CURRENT PIXEL IS DIFFERENT FROM SLICE INCLUDING CURRENT PIXEL — S1810

WHEN SLICE INCLUDING ADJACENT PIXEL LOCATED AT UPPER-LEFT OR LOWER-RIGHT SIDE IS DIFFERENT FROM SLICE INCLUDING CURRENT PIXEL, DETERMINE VALUE OF ADJACENT PIXEL LOCATED AT UPPER-LEFT OR LOWER-RIGHT SIDE AS VALUE OF CLOSEST PIXEL IN HORIZONTAL DIRECTION OF ADJACENT PIXEL LOCATED AT UPPER-LEFT OR LOWER-RIGHT SIDE FROM AMONG PIXELS INCLUDED IN SLICE INCLUDING CURRENT PIXEL — S1830

DETERMINE ADAPTIVE LOOP FILTER INCLUDING FILTER COEFFICIENT FOR CURRENT PIXEL AND ADJACENT PIXELS BASED ON VALUES OF CURRENT PIXEL AND ADJACENT PIXELS — S1850

BY APPLYING ADAPTIVE LOOP FILTER TO CURRENT PIXEL, CORRECT VALUE OF CURRENT PIXEL BY USING VALUES OF ADJACENT PIXELS — S1870

ENCODE CURRENT BLOCK INCLUDING CURRENT PIXEL — S1890

| BLOCK A | BLOCK B |
|---------|---------|
| BLOCK C | BLOCK D |

BLOCK A: OUTSIDE SLICE BOUNDARY
BLOCK B, C, D: WITHIN SLICE BOUNDARY

| A0 | A1 | B0 | B1 | B2 |
|----|----|----|----|----|
| A2 | A3 | B3 | B4 | B5 |
| C0 | C1 | D0 | D1 | D2 |
| C2 | C3 | D3 | D4 | D5 |
| C4 | C5 | D6 | D7 | D8 |

| BLOCK A | BLOCK B |
|---------|---------|
| BLOCK C | BLOCK D |

BLOCK D: OUTSIDE SLICE BOUNDARY
BLOCK A, B, C: WITHIN SLICE BOUNDARY

| A0 | A1 | A2 | B0 | B1 |
|----|----|----|----|----|
| A3 | A4 | A5 | B2 | B3 |
| A6 | A7 | A8 | B4 | B5 |
| C0 | C1 | C2 | D0 | D1 |
| C3 | C4 | C5 | D2 | D3 |

VIDEO DECODING METHOD AND APPARATUS, AND VIDEO ENCODING METHOD AND APPARATUS

CROSS-REFERENCE TO RELATED APPLICATIONS

This application is a Continuation of U.S. application Ser. No. 17/573,181 filed on Jan. 11, 2022, which is a Continuation application of International Application PCT/KR2020/009085 filed on Jul. 10, 2020, which claims benefit of U.S. Provisional Application 62/872,811 filed on Jul. 11, 2019, at the U.S.P.T.O., the disclosures of which are incorporated herein in their entireties by reference.

BACKGROUND

1. Field

The disclosure relates to a video decoding method and a video decoding apparatus, and more particularly, to a method and apparatus for determining whether a slice including an adjacent pixel located at the upper-left or lower-right side of a current pixel from among adjacent pixels used for an adaptive loop filter of the current pixel is different from a slice including the current pixel, when the slice including the adjacent pixel located at the upper-left or lower-right side is different from the slice including the current pixel, determining a value of the adjacent pixel located at the upper-left or lower-right side as a value of a closest pixel in a horizontal direction of the adjacent pixel located at the upper-left or lower-right side from among pixels included in the slice including the current pixel, determining an adaptive loop filter including a filter coefficient for the current pixel and the adjacent pixels based on values of the current pixel and the adjacent pixels, correcting the value of the current pixel by using the values of the adjacent pixels, by applying the adaptive loop filter to the current pixel, and encoding or decoding a current block including the current pixel.

2. Description of Related Art

Image data is encoded by a codec according to a predetermined data compression standard, for example, a moving picture expert group (MPEG) standard, and then is stored in the form of a bitstream in a recording medium or is transmitted via a communication channel.

With the development and supply of hardware capable of reproducing and storing high-resolution or high-definition image content, there is an increasing demand for a codec for effectively encoding or decoding the high-resolution or high-definition image content. Encoded image content may be reproduced by being decoded. Recently, methods for effectively compressing such high-resolution or high-definition image content have been implemented. For example, methods are proposed to effectively implement an image compression technology through a process of splitting an image to be encoded by a random method or through a process of rendering data.

As one data manipulation technique, when adaptive loop filter (ALF) filtering is applied, in a case where an upper block, a lower block, a left block, or a right block of a current block is located outside a boundary of a slice including the current block, filtering is generally performed after pixel padding is performed.

In a video encoding and decoding process, when adaptive loop filter (ALF) filtering is applied, when an upper block, a lower block, a left block, or a right block of a current block is located outside an area including the current block, filtering is generally performed after pixel padding is performed. However, when the ALF filtering is applied at a slice boundary according to a raster scan order, in a case where an upper block and a left block of a current block including a current pixel are the same slice as the current pixel or in a case where a lower block and a right block of the current block are the same slice as the current block, pixel padding is not performed. In this case, in a case where an upper-left or lower-right adjacent pixel of the current block is located outside a slice boundary, pixel padding is not performed, so that a pixel value outside the slice boundary is applied to filtering. Accordingly, it is necessary to identify whether the upper-left or lower-right adjacent pixel is located outside the slice boundary, and apply pixel padding even when the adjacent pixel is located outside the slice boundary.

In detail, provided are a method and apparatus for determining whether a slice including an adjacent pixel located at the upper-left or lower-right side of a current pixel from among adjacent pixels used for an ALF of the current pixel is different from a slice including the current pixel, when the slice including the adjacent pixel at the upper-left or lower-right location is different from the slice including the current pixel, determining a value of the adjacent pixel located at the upper-left or lower-right side as a value of a closest pixel in a horizontal direction of the adjacent pixel located at the upper-left or lower-right side from among pixels included in the slice including the current pixel, determining an ALF including a filter coefficient for the current pixel and the adjacent pixels based on values of the current pixel and the adjacent pixels, correcting the value of the current pixel by using the values of the adjacent pixels, by applying the ALF to the current pixel, and encoding/decoding a current block including the current pixel.

In order to solve the technical problem, provided is a video decoding method including: determining whether a slice including an adjacent pixel located at an upper-left or lower-right side of a current pixel from among adjacent pixels used for an adaptive loop filter of the current pixel is different from a slice including the current pixel; when the slice including the adjacent pixel located at the upper-left or lower-right side is different from the slice including the current pixel, determining a value of the adjacent pixel located at the upper-left or lower-right side as a value of a closest pixel in a horizontal direction of the adjacent pixel located at the upper-left or lower-right from among pixels included in the slice including the current pixel; determining an adaptive loop filter including a filter coefficient for the current pixel and the adjacent pixels based on values of the current pixel and the adjacent pixels; by applying the adaptive loop filter to the current pixel, correcting the value of the current pixel by using the values of the adjacent pixels; and decoding a current block including the current pixel.

In order to solve the technical problem, provided is a video decoding apparatus including: a memory; and at least one processor connected to the memory, wherein the at least one processor may be configured to: determine whether a slice including an adjacent pixel located at an upper-left or lower-right side of a current pixel from among adjacent pixels used for an adaptive loop filter of the current pixel is different from a slice including the current pixel; when the slice including the adjacent pixel located at the upper-left or lower-right side is different from the slice including the current pixel, determine a value of the adjacent pixel located at the upper-left or lower-right side as a value of a closest pixel in a horizontal direction of the adjacent pixel located at the upper-left or lower-right from among pixels included in the slice including the current pixel; determine an adaptive loop filter including a filter coefficient for the current pixel and the adjacent pixels based on values of the current pixel and the adjacent pixels; by applying the adaptive loop filter to the current pixel, correct the value of the current pixel by using the values of the adjacent pixels; and decode a current block including the current pixel.

In order to solve the technical problem, provided is a video encoding method including: determining whether a slice including an adjacent pixel located at an upper-left or lower-right side of a current pixel from among adjacent pixels used for an adaptive loop filter of the current pixel is different from a slice including the current pixel; when the slice including the adjacent pixel located at the upper-left or lower-right side is different from the slice including the current pixel, determining a value of the adjacent pixel located at the upper-left or lower-right side as a value of a closest pixel in a horizontal direction of the adjacent pixel located at the upper-left or lower-right from among pixels included in the slice including the current pixel; determining an adaptive loop filter including a filter coefficient for the current pixel and the adjacent pixels based on values of the current pixel and the adjacent pixels; by applying the adaptive loop filter to the current pixel, correcting the value of the current pixel by using the values of the adjacent pixels; and encoding a current block including the current pixel.

In order to solve the technical problem, provided is a video encoding apparatus including: a memory; and at least one processor connected to the memory, wherein the at least one processor may be configured to: determine whether a slice including an adjacent pixel located at an upper-left or lower-right side of a current pixel from among adjacent pixels used for an adaptive loop filter of the current pixel is different from a slice including the current pixel; when the slice including the adjacent pixel located at the upper-left or lower-right side is different from the slice including the current pixel, determine a value of the adjacent pixel located at the upper-left or lower-right side as a value of a closest pixel in a horizontal direction of the adjacent pixel located at the upper-left or lower-right from among pixels included in the slice including the current pixel; determine an adaptive loop filter including a filter coefficient for the current pixel and the adjacent pixels based on values of the current pixel and the adjacent pixels; by applying the adaptive loop filter to the current pixel, correct the value of the current pixel by using the values of the adjacent pixels; and encode a current block including the current pixel.

In a video encoding and decoding process, it is determined whether a slice including an adjacent pixel located at the upper-left or lower-right side of a current pixel from among adjacent pixels used for an adaptive loop filter (ALF) of the current pixel is different from a slice including the current pixel, when the slice including the adjacent pixel at the upper-left or lower-right location is different from the slice including the current pixel, a value of the adjacent pixel located at the upper-left or lower-right side is determined as a value of a closest pixel in a horizontal direction of the adjacent pixel located at the upper-left or lower-right side from among pixels included in the slice including the current pixel, an ALF including a filter coefficient for the current pixel and the adjacent pixels is determined based on values of the current pixel and the adjacent pixels, the value of the current pixel is corrected by using the values of the adjacent pixels, by applying the ALF to the current pixel, and a current block including the current pixel is encoded/decoded so that, even in a case where an upper-left or lower-right pixel of the current pixel is located outside a slice boundary, ALF filtering is applied after pixel padding is performed, thereby improving encoding efficiency and filtering effect.

SUMMARY

According to an embodiment of the disclosure, a video decoding method may include: determining whether a slice including an adjacent pixel located at an upper-left or lower-right side of a current pixel from among adjacent pixels used for an adaptive loop filter of the current pixel is different from a slice including the current pixel; when the slice including the adjacent pixel located at the upper-left or lower-right side is different from the slice including the current pixel, determining a value of the adjacent pixel located at the upper-left or lower-right side as a value of a closest pixel in a horizontal direction of the adjacent pixel located at the upper-left or lower-right from among pixels included in the slice including the current pixel; determining an adaptive loop filter including a filter coefficient for the current pixel and the adjacent pixels based on a value of the current pixel and values of the adjacent pixels; by applying the adaptive loop filter to the current pixel, correcting the value of the current pixel by using the values of the adjacent pixels; and decoding a current block including the current pixel.

According to an embodiment, when the current block is a luma block, the adaptive loop filter may be a 7×7 diamond-shaped filter.

According to an embodiment, when the current block is a chroma block, the adaptive loop filter may be a 5×5 diamond-shaped filter.

According to an embodiment, the current pixel may be a pixel to which deblocking filtering for removing a block effect and sample offset filtering for correcting a value of a pixel by using at least one of an edge offset and a band offset are applied.

According to an embodiment, the correcting of the value of the current pixel by using the values of the adjacent pixels may further include adding the value of the current pixel and a value obtained by multiplying a difference between the value of the current pixel and each of the values of the adjacent pixels by the filter coefficient.

According to an embodiment, the filter coefficient may be determined based on a directionality and variance of the current pixel and each adjacent pixel.

According to an embodiment, if an adjacent pixel located at an upper side of the current pixel is located outside an upper boundary line of a slice including the current block, a value of the adjacent pixel located at the upper side of the current pixel may be determined as a value of a closest pixel in a vertical direction of the adjacent pixel located at the upper side from among pixels included in the current block, if an adjacent pixel located at a lower side of the current pixel is located outside a lower boundary line of the slice including the current block, a value of the adjacent pixel located at the lower side of the current pixel may be determined as a value of a closest pixel in a vertical direction of the adjacent pixel located at the lower side from among the pixels included in the current block, if an adjacent pixel located at a left side of the current pixel is located outside a left boundary line of the slice including the current block, a value of the adjacent pixel located at the left side of the current pixel may be determined as a value of a closest pixel in a horizontal direction of the adjacent pixel located at the left side from among the pixels included in the current block, and if an adjacent pixel located at a right side of the current pixel is located outside a right boundary line of the slice including the current block, a value of the adjacent pixel located at the right side of the current pixel may be determined as a value of a closest pixel in a horizontal direction of the adjacent pixel located at the right side from among the pixels included in the current block.

According to an embodiment of the disclosure, a video encoding method may include: determining whether a slice including an adjacent pixel located at an upper-left or lower-right side of a current pixel from among adjacent pixels used for an adaptive loop filter of the current pixel is different from a slice including the current pixel; when the slice including the adjacent pixel located at the upper-left or lower-right side is different from the slice including the current pixel, determining a value of the adjacent pixel located at the upper-left or lower-right side as a value of a closest pixel in a horizontal direction of the adjacent pixel located at the upper-left or lower-right from among pixels included in the slice including the current pixel; determining an adaptive loop filter including a filter coefficient for the current pixel and the adjacent pixels based on values of the current pixel and the adjacent pixels; by applying the adaptive loop filter to the current pixel, correcting the value of the current pixel by using the values of the adjacent pixels; and encoding a current block including the current pixel.

According to an embodiment, when the current block is a luma block, the adaptive loop filter may be a 7×7 diamond-shaped filter.

According to an embodiment, when the current block is a chroma block, the adaptive loop filter may be a 5×5 diamond-shaped filter.

According to an embodiment, the current pixel may be a pixel to which deblocking filtering for removing a block effect and sample offset filtering for correcting a value of a pixel by using at least one of an edge offset and a band offset are applied.

According to an embodiment, the correcting of the value of the current pixel by using the values of the adjacent pixels may further include adding the value of the current pixel and a value obtained by multiplying a difference between the value of the current pixel and each of the values of the adjacent pixels by the filter coefficient.

According to an embodiment, the filter coefficient may be determined based on a directionality and variance of the current pixel and each adjacent pixel.

According to an embodiment, if an adjacent pixel located at an upper side of the current pixel is located outside an upper boundary line of a slice including the current block, a value of the adjacent pixel located at the upper side of the current pixel may be determined as a value of a closest pixel in a vertical direction of the adjacent pixel located at the upper side from among pixels included in the current block, if an adjacent pixel located at a lower side of the current pixel is located outside a lower boundary line of the slice including the current block, a value of the adjacent pixel located at the lower side of the current pixel may be determined as a value of a closest pixel in a vertical direction of the adjacent pixel located at the lower side from among the pixels included in the current block, if an adjacent pixel located at a left side of the current pixel is located outside a left boundary line of the slice including the current block, a value of the adjacent pixel located at the left side of the current pixel may be determined as a value of a closest pixel in a horizontal direction of the adjacent pixel located at the left side from among the pixels included in the current block, and if an adjacent pixel located at a right side of the current pixel is located outside a right boundary line of the slice including the current block, a value of the adjacent pixel located at the right side of the current pixel may be determined as a value of a closest pixel in a horizontal direction of the adjacent pixel located at the right side from among the pixels included in the current block.

According to an embodiment of the disclosure, a video decoding apparatus may include: a memory; and at least one processor connected to the memory, wherein the at least one processor may be configured to: determine whether a slice including an adjacent pixel located at an upper-left or lower-right side of a current pixel from among adjacent pixels used for an adaptive loop filter of the current pixel is different from a slice including the current pixel; when the slice including the adjacent pixel located at the upper-left or lower-right side is different from the slice including the current pixel, determine a value of the adjacent pixel located at the upper-left or lower-right side as a value of a closest pixel in a horizontal direction of the adjacent pixel located at the upper-left or lower-right from among pixels included in the slice including the current pixel; determine an adaptive loop filter including a filter coefficient for the current pixel and the adjacent pixels based on values of the current pixel and the adjacent pixels; by applying the adaptive loop filter to the current pixel, correct the value of the current pixel by using the values of the adjacent pixels; and decode a current block including the current pixel.

BRIEF DESCRIPTION OF DRAWINGS

FIG. 3 illustrates a process, performed by an image decoding apparatus, of determining at least one coding unit by splitting a current coding unit, according to an embodiment.

FIG. 4 illustrates a process, performed by an image decoding apparatus, of determining at least one coding unit by splitting a non-square coding unit, according to an embodiment.

FIG. 6 illustrates a method, performed by an image decoding apparatus, of determining a predetermined coding unit from among an odd number of coding units, according to an embodiment.

FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

FIG. 11 illustrates a process, performed by an image decoding apparatus, of splitting a square coding unit when split shape mode information indicates that the square coding unit is not to be split into four square coding units, according to an embodiment.

FIG. 13 illustrates a process of determining a depth of a coding unit as a shape and a size of the coding unit change, when the coding unit is recursively split such that a plurality of coding units are determined, according to an embodiment.

FIG. 14 illustrates depths that are determinable based on shapes and sizes of coding units, and part indexes (PIDs) that are for distinguishing the coding units, according to an embodiment.

FIG. 18 is a flowchart illustrating a video encoding method according to an embodiment.

DETAILED DESCRIPTION OF EXEMPLARY EMBODIMENTS

Figure 1:
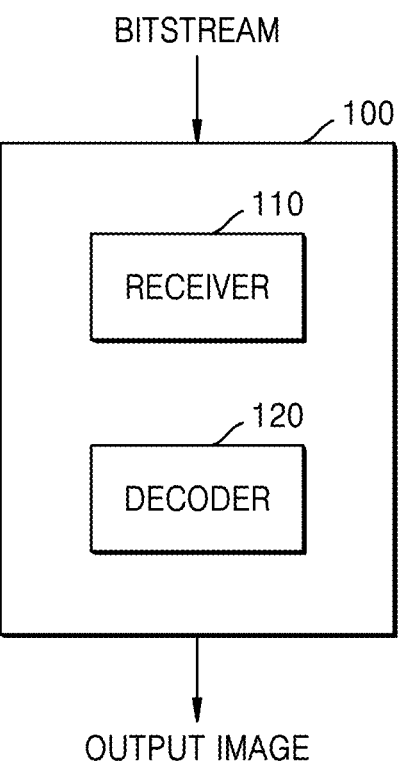
FIG. 1 illustrates a schematic block diagram of an image decoding apparatus according to an embodiment.

Advantages and features of embodiments and methods of accomplishing the same may be understood more readily by reference to the embodiments and the accompanying drawings. In this regard, the disclosure may have different forms and should not be construed as being limited to the embodiments set forth herein. Rather, these embodiments are provided so that this disclosure will be thorough and complete and will fully convey the concept of the disclosure to one of ordinary skill in the art.

The terms used in the specification will be briefly defined, and the embodiments will be described in detail.

All terms including descriptive or technical terms which are used in the specification should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following description, terms such as "unit" indicate a software or hardware component and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, and variables. A function provided by the components and "units" may be associated with a smaller number of components and "units", or may be divided into additional components and "units".

According to an embodiment of the disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, and the like. In some environments, the "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configurations.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EE-PROM), a flash memory, a magnetic or optical data storage device, registers, and the like. When the processor can read information from a memory and/or write information to the memory, the memory is said to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling location of an image, i.e., data to be processed. For example, pixel values of an image in a spatial domain and transform coefficients on a transform domain may be samples. A unit including at least one such sample may be defined as a block.

Also, in the present specification, a "current block" may denote a block of a largest coding unit, a coding unit, a prediction unit, or a transform unit of a current image to be encoded or decoded.

Hereinafter, the disclosure will now be described more fully with reference to the accompanying drawings for one of ordinary skill in the art to be able to perform the embodiments without any difficulty. In addition, portions irrelevant to the description will be omitted in the drawings for a clear description of the disclosure.

Hereinafter, an image encoding apparatus, an image decoding apparatus, an image encoding method, and an image decoding method, according to an embodiment, will be described with reference to FIGS. 1 to 16. A method of determining a data unit of an image, according to an embodiment, will be described with reference to FIGS. 3 to 16. A video encoding/decoding method according to an embodiment will be described below with reference to FIGS. 17 to 29, the video encoding/decoding method involving determining whether a slice including an adjacent pixel located at the upper-left or lower-right side of a current pixel from among adjacent pixels used for an adaptive loop filter (ALF) of the current pixel is different from a slice including the current pixel, when the slice including the adjacent pixel located at the upper-left or lower-right side is different from the slice including the current pixel, determining a value of the adjacent pixel located at the upper-left or lower-right side as a value of a closest pixel in a horizontal direction of the adjacent pixel located at the upper-left or lower-right side from among pixels included in the slice including the current pixel, determining an ALF including a filter coefficient for the current pixel and the adjacent pixels based on values of the current pixel and the adjacent pixels, correcting the value of the current pixel by using the values of the adjacent pixels, by applying the ALF to the current pixel, and encoding/decoding a current block including the current pixel.

Hereinafter, a method and apparatus for adaptively selecting a context model, based on various shapes of coding units, according to an embodiment of the disclosure, will be described with reference to FIGS. 1 and 2.

FIG. 1 illustrates a schematic block diagram of an image decoding apparatus according to an embodiment.

The image decoding apparatus 100 may include a receiver 110 and a decoder 120. The receiver 110 and the decoder 120 may each include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 described below. Also, the bitstream may be transmitted from the image encoding apparatus. The image encoding apparatus and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
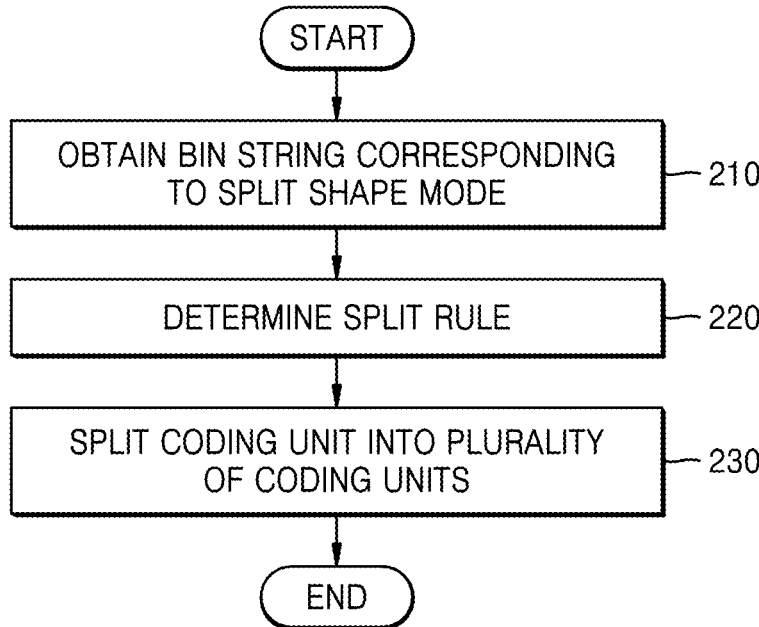
FIG. 2 illustrates a flowchart of an image decoding method according to an embodiment.

FIG. 2 illustrates a flowchart of an image decoding method according to an embodiment.

According to an embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of coding units (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding block (CTB) denotes an N×N block including N×N samples (where N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a predetermined size including a predetermined number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 to 16.

Also, one or more prediction blocks for prediction may be determined from a coding unit. The prediction block may be the same as or smaller than the coding unit. Also, one or more transform blocks for transformation may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 to 16. A current block and an adjacent block of the disclosure may indicate one of the largest coding unit, the coding unit, the prediction block, and the transform block. Also, the current block of the current coding unit is a block that is currently being decoded or encoded or a block that is currently being split. The adjacent block may be a block reconstructed before the current block. The adjacent block may be adjacent to the current block spatially or temporally. The adjacent block may be located at one of the lower left, left, upper left, top, upper right, right, lower right of the current block.

Figure 3:
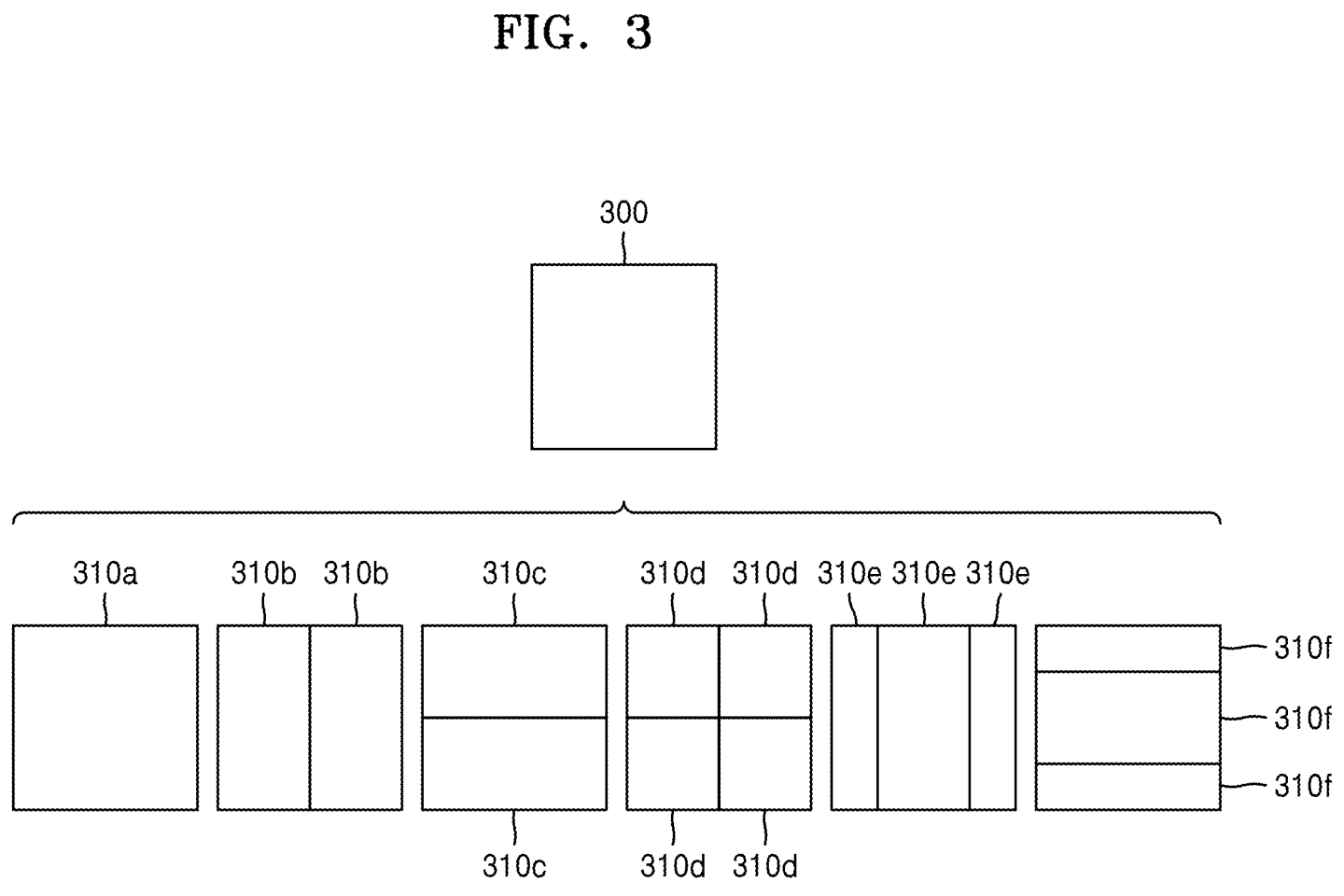

FIG. 3 illustrates a process, performed by an image decoding apparatus, of determining at least one coding unit by splitting a current coding unit, according to an embodiment.

A block shape may include $4N\times4N$, $4N\times2N$, $2N\times4N$, $4N\times N$, $N\times4N$, $32N\times N$, $N\times32N$, $16N\times N$, $N\times16N$, $8N\times N$, or $N\times8N$. Here, N may be a positive integer. Block shape information is information indicating at least one of a shape, a direction, a ratio of width and height, or size of a coding unit.

The shape of the coding unit may include a square and a non-square. When the lengths of the width and height of the coding unit are the same (i.e., when the block shape of the coding unit is $4N\times4N$), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is $4N\times2N$, $2N\times4N$, $4N\times N$, $N\times4N$, $32N\times N$, $N\times32N$, $16N\times N$, $N\times16N$, $8N\times N$, or $N\times8N$), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of $1:2$, $2:1$, $1:4$, $4:1$, $1:8$, $8:1$, $1:16$, $16:1$, $1:32$, and $32:1$. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a minimum coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be $256\times256$. The image decoding apparatus 100 may determine the pre-agreed split shape mode information to be a quad split. The quad split is a split shape mode in which the width and the height of the coding unit are both bisected. The image decoding apparatus 100 may obtain a coding unit of a $128\times128$ size from the largest coding unit of a $256\times256$ size, based on the split shape mode information. Also, the image decoding apparatus 100 may determine the size of the smallest coding unit to be $4\times4$. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating not to perform splitting, or may determine coding units 310b, 310c, 310d, 310e, or 310f split based on the split shape mode information indicating a predetermined splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary splitting in a vertical direction. The image decoding apparatus 100 may determine three coding units 310f obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Predetermined splitting methods of splitting the square coding unit will be described in detail below in relation to various embodiments.

FIG. 4 illustrates a process, performed by an image decoding apparatus, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420a and 420b, 430a to 430c, 470a and 470b, or 480a to 480c split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into an odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine an odd number of coding units included in the current coding unit 400 or 450, and not all the determined coding units may have the same size. For example, a predetermined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a predetermined restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c, or 480a, 480b, and 480c generated as the current coding unit 400 or 450 is split to be different from that of the other coding units 430a and 430c, or 480a and 480c. For example, the image decoding apparatus 100 may restrict the coding unit 430b or 480b at the center location to be no longer split or to be split only a predetermined number of times, unlike the other coding units 430a and 430c, or 480a and 480c.

Figure 5:
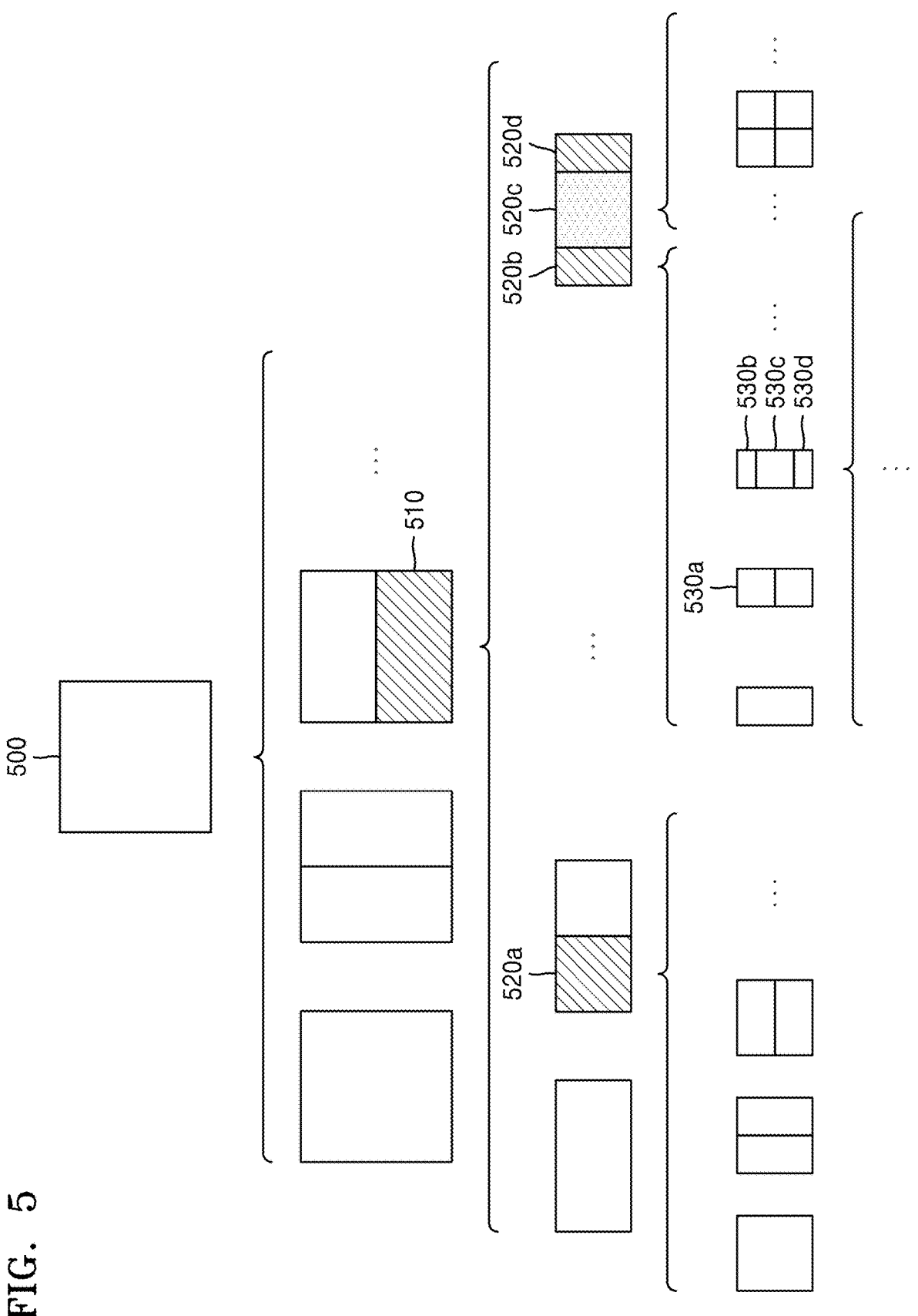
FIG. 5 illustrates a process, performed by an image decoding apparatus, of splitting a coding unit based on at least one of block shape information and split shape mode information, according to an embodiment.

FIG. 5 illustrates a process, performed by an image decoding apparatus, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520*a*, 520*b*, 520*c*, and 520*d* based on at least one of the split shape mode information and the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520*a*, or 520*b*, 520*c*, and 520*d*) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a predetermined coding unit (e.g., a coding unit located at a center location, or a square coding unit) from among an odd number of third coding units 520*b*, 520*c*, and 520*d* determined by splitting the non-square second coding unit 510 may be recursively split. According to an embodiment, the square third coding unit 520*c* from among the odd number of third coding units 520*b*, 520*c*, and 520*d* may be split in a horizontal direction into a plurality of fourth coding units. A non-square fourth coding unit 530*b* or 530*d* from among the plurality of fourth coding units 530*a*, 530*b*, 530*c*, and 530*d* may be re-split into a plurality of coding units. For example, the non-square fourth coding unit 530*b* or 530*d* may be re-split into an odd number of coding units. A method that may be used to recursively split a coding unit will be described below in relation to various embodiments.

According to an embodiment, the image decoding apparatus 100 may split each of the third coding units 520*a*, or 520*b*, 520*c*, and 520*d* into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520*b*, 520*c*, and 520*d*. The image decoding apparatus 100 may put a predetermined restriction on a predetermined third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a predetermined location in the current coding unit.

FIG. 6 illustrates a method, performed by an image decoding apparatus, of determining a predetermined coding unit from among an odd number of coding units, according to an embodiment.

Referring to FIG. 6, split shape mode information of a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding apparatus 100 may obtain the split shape mode information from the predetermined location and may determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of predetermined samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of upper-left samples 630*a*, 630*b*, and 630*c* of the coding units 620*a*, 620*b*, and 620*c*.

According to an embodiment, the information indicating the locations of the upper-left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the upper-left samples 630*a*, 630*b*, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper-left sample 630a of the upper coding unit 620a may include coordinates (xa, ya), information indicating the location of the upper-left sample 630b of the center coding unit 620b may include coordinates (xb, yb), and information indicating the location of the upper-left sample 630c of the lower coding unit 620c may include coordinates (xc, yc). The image decoding apparatus 100 may determine the middle coding unit 620b by using the coordinates of the upper-left samples 630a, 630b, and 630c which are included in the coding units 620a, 620b, and 620c, respectively. For example, when the coordinates of the upper-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper-left samples 630a, 630b, and 630c may include coordinates indicating absolute locations in the picture, or may use coordinates (dxb, dyb) indicating a relative location of the upper-left sample 630b of the middle coding unit 620b and coordinates (dxc, dyc) indicating a relative location of the upper-left sample 630c of the lower coding unit 620c with reference to the location of the upper-left sample 630a of the upper coding unit 620a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper-left sample 630a of the upper coding unit 620a, the coordinates (xb, yb) that is the information indicating the location of the upper-left sample 630b of the middle coding unit 620b, and the coordinates (xc, yc) that are the information indicating the location of the upper-left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a, 620b, and 620c. Referring to FIG. 6, the image decoding apparatus 100 may determine the middle coding unit 620b, which has a size different from the size of the upper and lower coding units 620a and 620c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 660a, 660b, and 660c by using the coordinates (xd, yd) that are information indicating the location of an upper-left sample 670a of the left coding unit 660a, the coordinates (xe, ye) that are information indicating the location of an upper-left sample 670b of the middle coding unit 660b, and the coordinates (xf, yf) that are information indicating a location of the upper-left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the sizes of the left and right coding units 660a and 660c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (binary splitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use the split shape mode information, which is obtained from a sample at a predetermined location in the current coding unit 600 (e.g., a sample at a center location of the current coding unit 600) to determine a coding unit at a predetermined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predetermined location by considering a block shape of the current coding unit 600, may determine the coding unit 620b including a sample, from which predetermined information (e.g., the split shape mode information) can be obtained, from among the plurality of coding units 620a, 620b, and 620c determined by splitting the current coding unit 600, and may put a predetermined restriction on the coding unit 620b. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620b including the sample 640, in a decoding operation. However, the location of the sample from which the predetermined information can be obtained is not limited to the above-described location, and may include arbitrary locations of samples included in the coding unit 620b to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for splitting at least one of a width and height of the current coding unit in half, as the sample from which the predetermined information can be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information can be obtained.

According to an embodiment, when the current coding unit is split into a plurality of coding units, the image decoding apparatus 100 may use the split shape mode information to determine a coding unit at a predetermined location from among the plurality of coding units. According to an embodiment, the image decoding apparatus 100 may obtain the split shape mode information from a sample at a predetermined location in a coding unit, and may split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
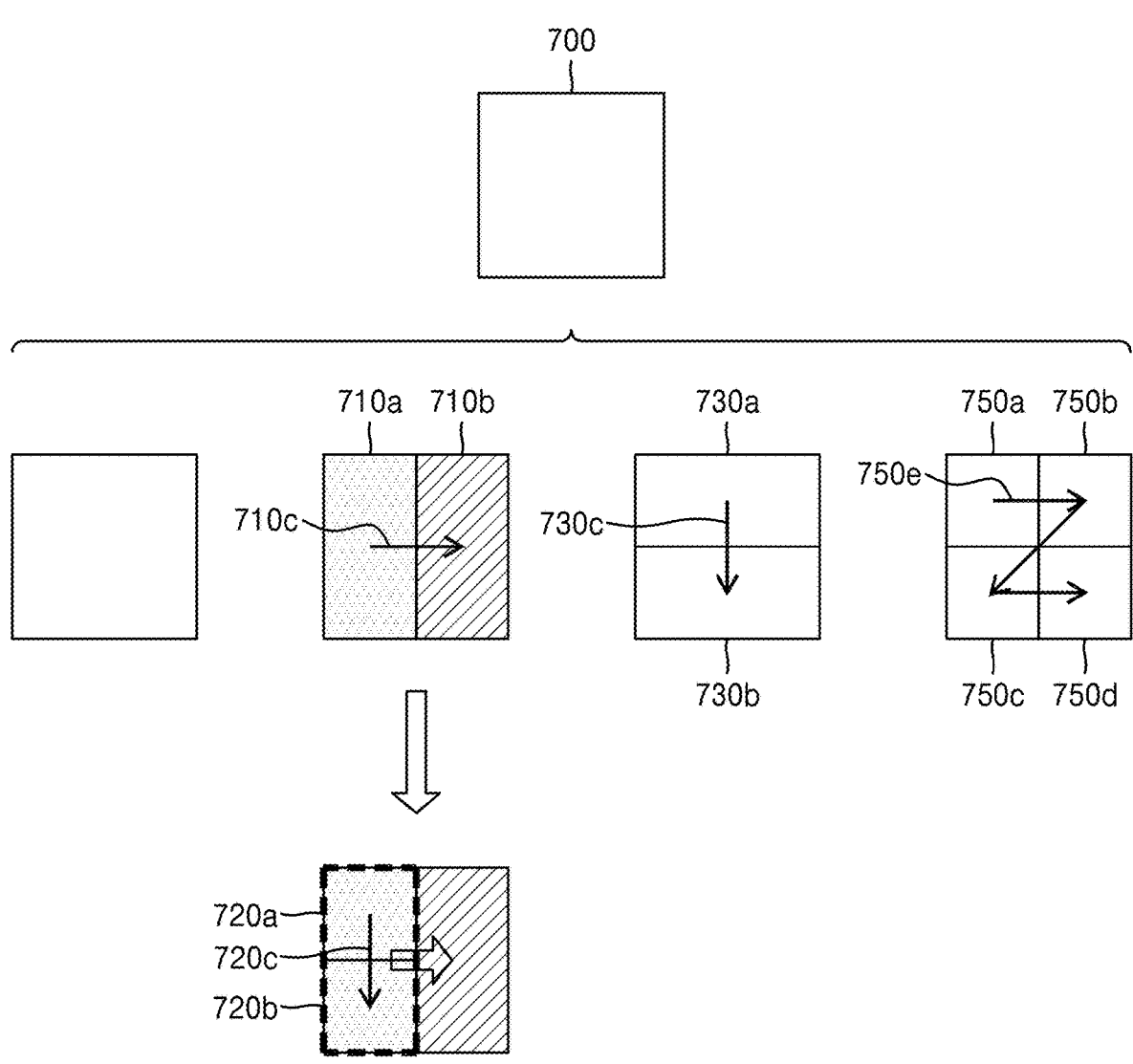
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a, 750b, 750c, and 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine the second coding units 750a, 750b, 750c, and 750d, which are determined by splitting the first coding unit 700 in vertical and horizontal directions, according to a predetermined order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a, 710b, 730a, 730b, 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a predetermined order.

Figure 8:
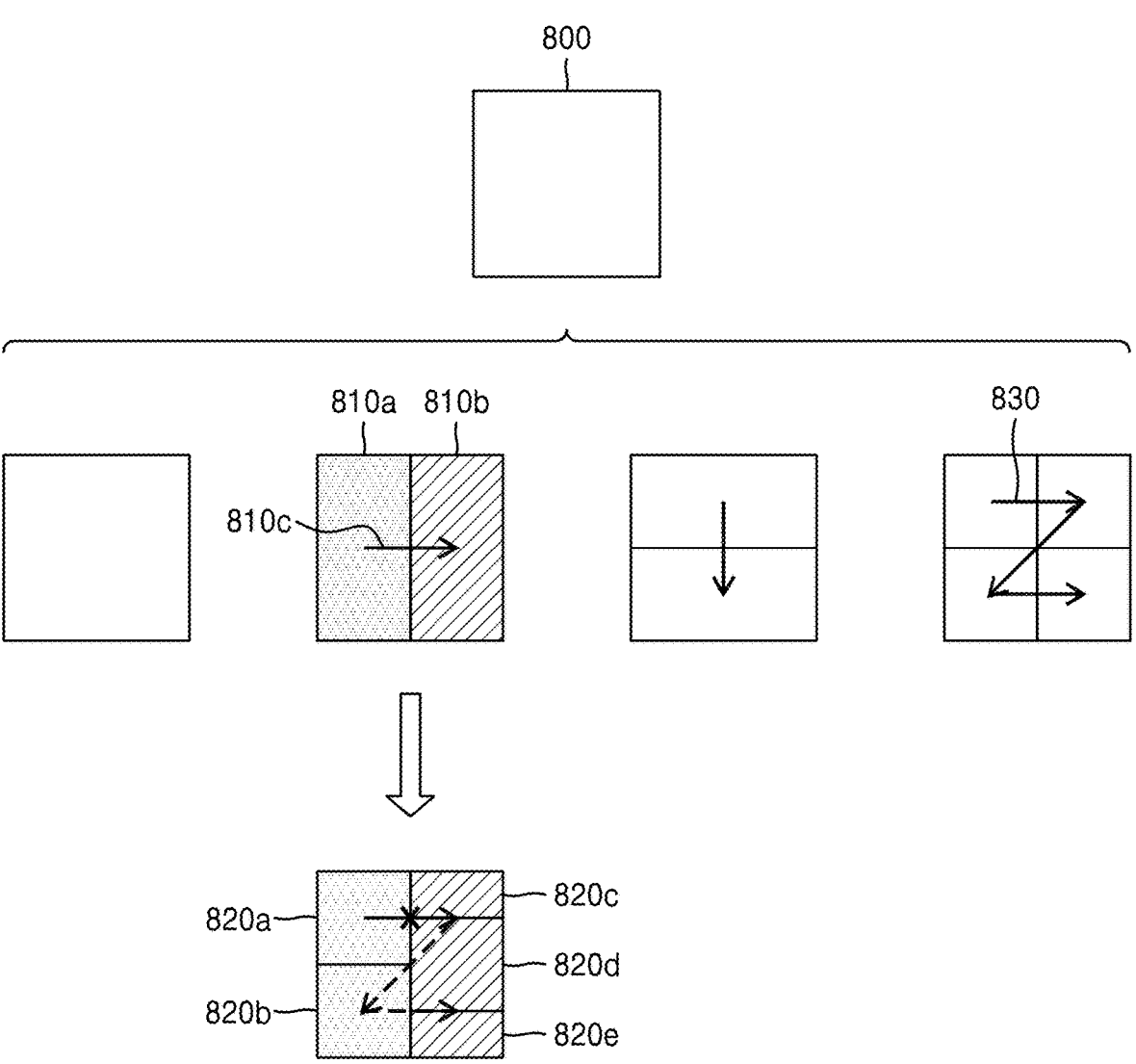
FIG. 8 illustrates a process, performed by an image decoding apparatus, of determining that a current coding unit is to be split into an odd number of coding units, when the coding units are not processable in a predetermined order, according to an embodiment.

FIG. 8 illustrates a process, performed by an image decoding apparatus, of determining that a current coding unit is to be split into an odd number of coding units, when the coding units are not processable in a predetermined order, according to an embodiment.

According to an embodiment, the image decoding apparatus 100 may determine that the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the video decoding apparatus 100 may determine whether any coding unit is split into an odd number of coding units, by determining whether the third coding units 820a and 820b, and 820c, 820d, and 820e are processable in a predetermined order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e are split into an odd number of coding units, based on at least one of the block shape information and the split shape mode information. For example, a coding unit located in the right from among the second coding units 810a and 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c, 820d, and 820e included in the first coding unit 800 satisfy the condition for processing in the predetermined order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

Figure 9:
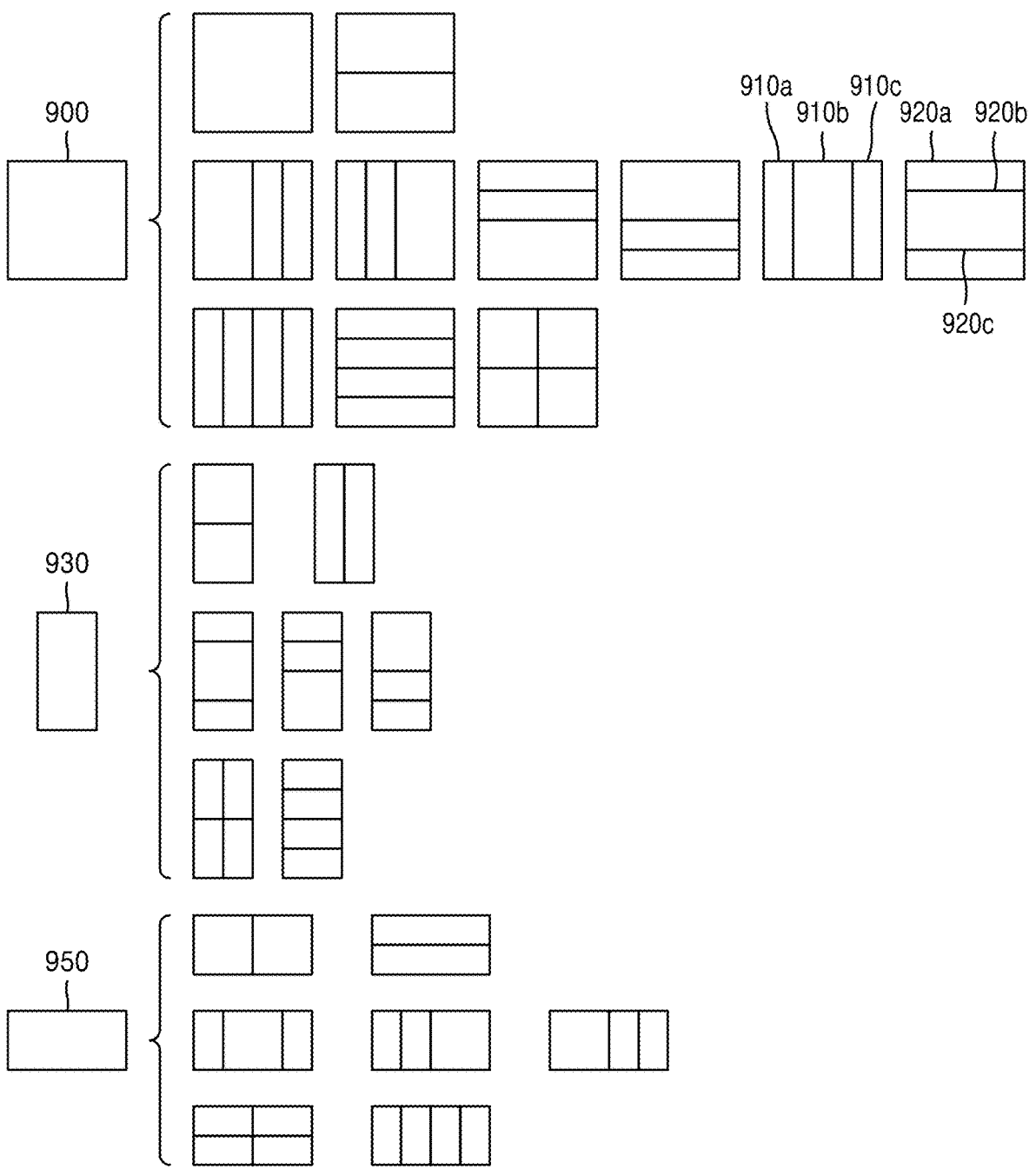
FIG. 9 illustrates a process, performed by an image decoding apparatus, of determining at least one coding unit by splitting a first coding unit, according to an embodiment.

FIG. 9 illustrates a process, performed by an image decoding apparatus, of determining at least one coding unit by splitting a first coding unit, according to an embodiment.

According to an embodiment, the image decoding apparatus 100 may split the first coding unit 900, based on split shape mode information, which is obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the predetermined order. Also, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
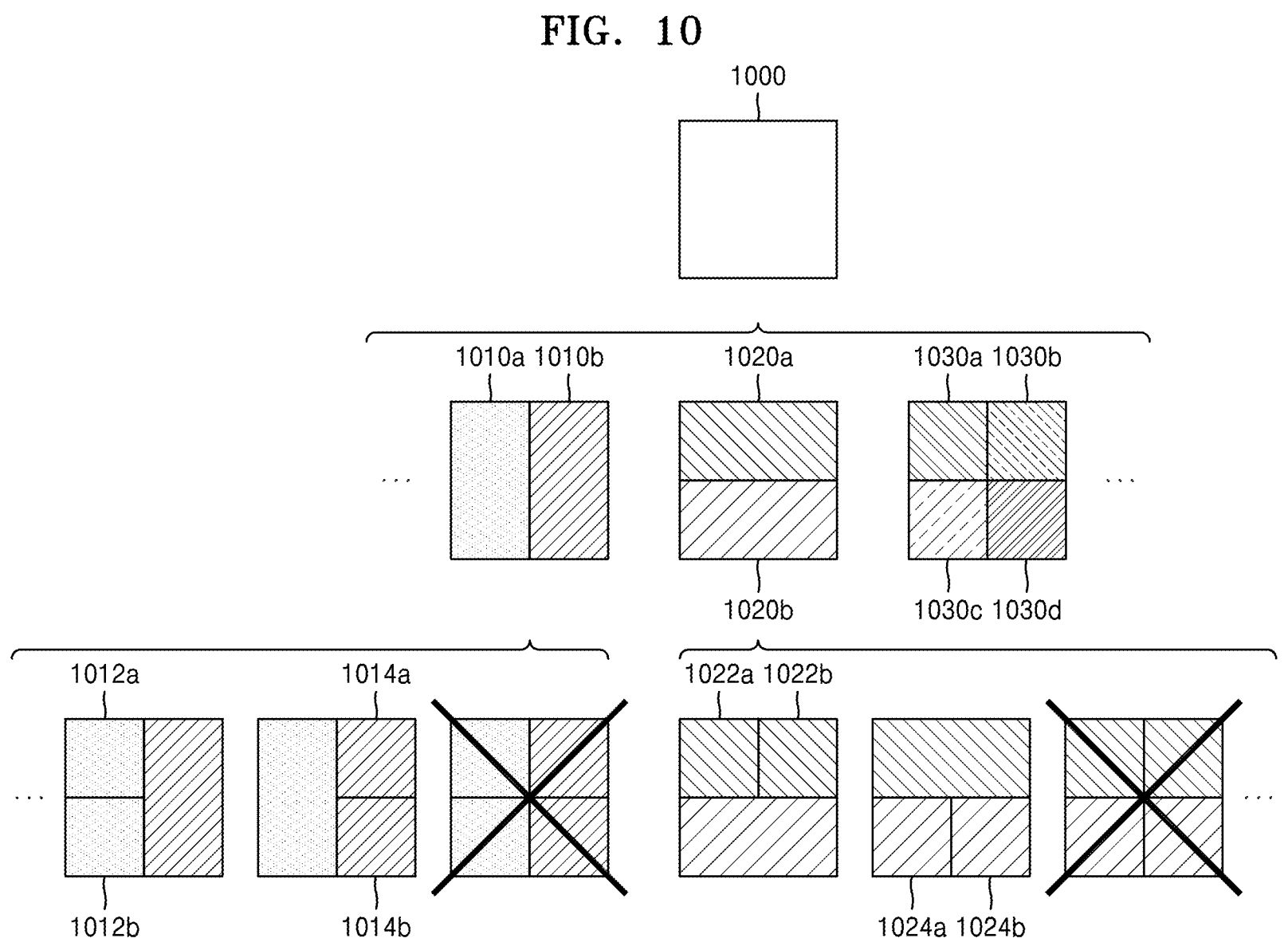

FIG. 10 illustrates that a shape into which a second coding unit is splittable is restricted when the second coding unit having a non-square shape, which is determined when an image decoding apparatus splits a first coding unit, satisfies a predetermined condition, according to an embodiment.

According to an embodiment, the image decoding apparatus 100 may determine to split the square first coding unit 1000 into non-square second coding units 1010a, and 1010b or 1020a and 1020b, based on split shape mode information, which is obtained by the receiver 110. The second coding units 1010a and 1010b, or 1020a and 1020b may be independently split. As such, the image decoding apparatus 100 may determine to split or not to split each of the second coding units 1010a and 1010b, or 1020a and 1020b into a plurality of coding units, based on the split shape mode information of each of the second coding units 1010a and 1010b, or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b not to be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b, or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) not to be split in a vertical direction in which the upper second coding unit 1020a is split.

Figure 11:
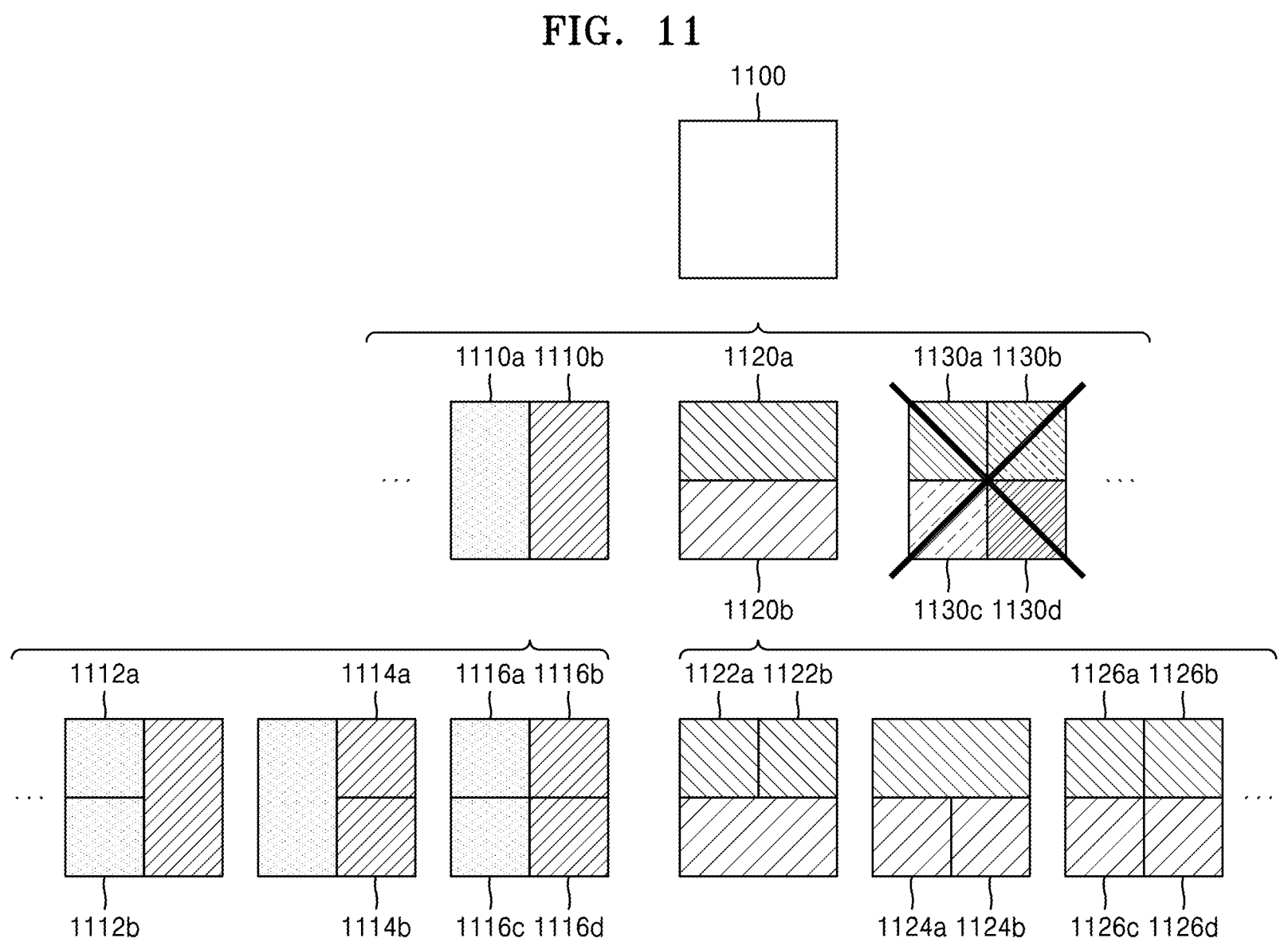

FIG. 11 illustrates a process, performed by an image decoding apparatus, of splitting a square coding unit when split shape mode information indicates that the square coding unit is not to be split into four square coding units, according to an embodiment.

According to an embodiment, the image decoding apparatus 100 may determine second coding units 1110a and 1110b, or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b, or 1120a and 1120b, etc., based on the split shape mode information.

According to an embodiment, the image decoding apparatus 100 may independently split the non-square second coding units 1110a and 1110b, or 1120a and 1120b, etc. Each of the second coding units 1110a and 1110b, or 1120a and 1120b, etc. may be recursively split in a predetermined order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
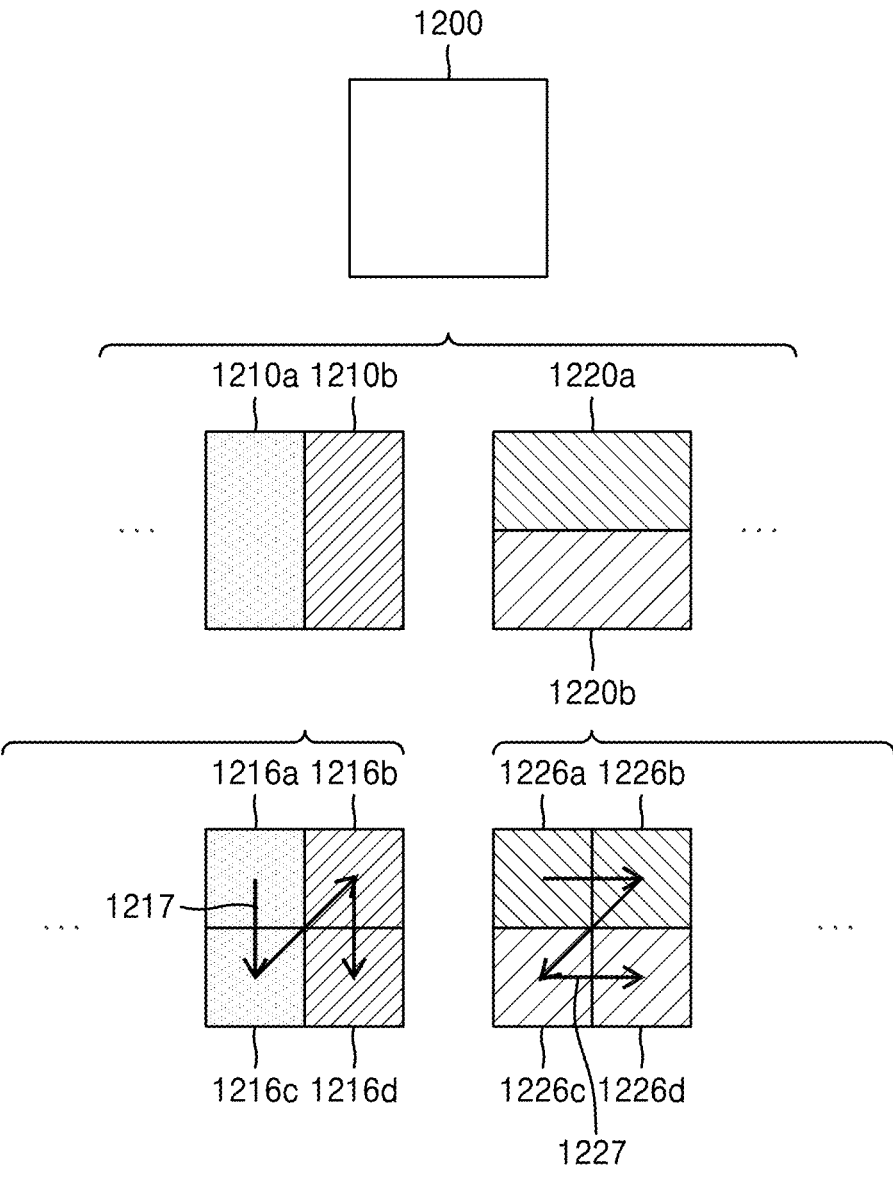
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b, or 1220a and 1220b, etc. by splitting the first coding unit 1200. Referring to FIG. 12, the non-square second coding units 1210a and 1210b, or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b, or 1220a and 1220b has been described above in relation to FIG. 11, and thus detailed descriptions thereof will not be provided herein.

According to an embodiment, the image decoding apparatus 100 may process coding units in a predetermined order. An operation of processing coding units in a predetermined order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a split shape by which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

Figure 13:
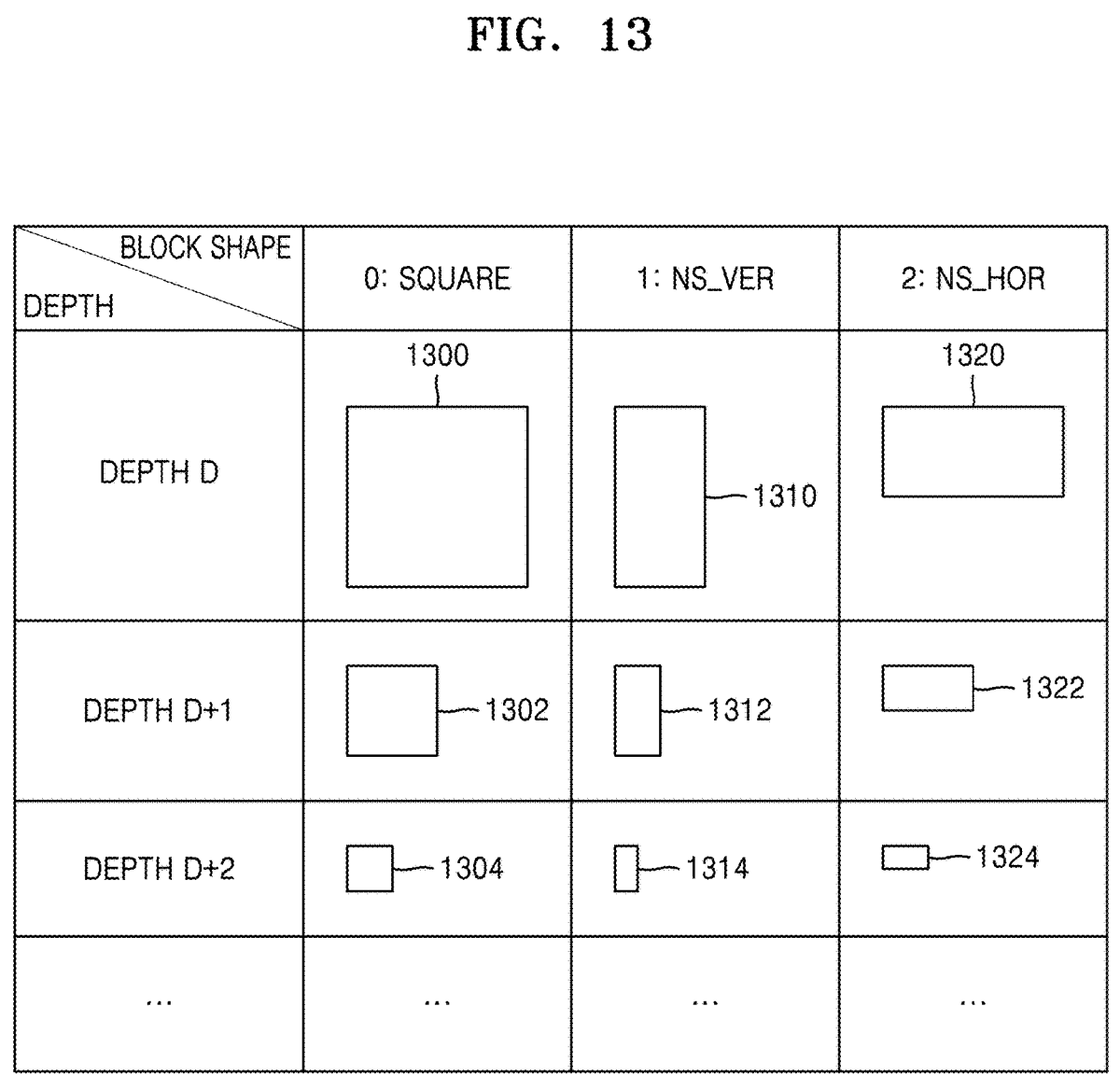

FIG. 13 illustrates a process of determining a depth of a coding unit as a shape and a size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402*a* and 1402*b*, 1404*a* and 1404*b*, and 1406*a*, 1406*b*, 1406*c*, and 1406*d* by splitting the first coding unit 1400 in at least one of vertical and horizontal directions based on split shape mode information. That is, the image decoding apparatus 100 may determine the second coding units 1402*a* and 1402*b*, 1404*a* and 1404*b*, and 1406*a*, 1406*b*, 1406*c*, and 1406*d*, based on the split shape mode information of the first coding unit 1400.

According to an embodiment, depths of the second coding units 1402*a* and 1402*b*, 1404*a* and 1404*b*, and 1406*a*, 1406*b*, 1406*c*, and 1406*d* that are determined based on the split shape mode information of the square first coding unit 1400 may be determined based on the length of a long side thereof. For example, because the length of a side of the square first coding unit 1400 equals the length of a long side of the non-square second coding units 1402*a* and 1402*b*, and 1404*a* and 1404*b*, the first coding unit 1400 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an embodiment, the image decoding apparatus 100 may determine a plurality of second coding units 1412*a* and 1412*b*, and 1414*a*, 1414*b*, and 1414*c* by splitting a first coding unit 1410, a height of which is longer than a width, in a horizontal direction based on the split shape mode information. According to an embodiment, the image decoding apparatus 100 may determine a plurality of second coding units 1422*a* and 1422*b*, and 1424*a*, 1424*b*, and 1424*c* by splitting a first coding unit 1420, a width of which is longer than a height, in a vertical direction based on the split shape mode information.

According to an embodiment, a depth of the second coding units 1412*a* and 1412*b*, and 1414*a*, 1414*b*, and 1414*c*, or 1422*a* and 1422*b*, and 1424*a*, 1424*b*, and 1424*c*, which are determined based on the split shape mode information of the non-square first coding unit 1410 or 1420, may be determined based on the length of a long side thereof. For example, because the length of a side of the square second coding units 1412*a* and 1412*b* is ½ times the length of a long side of the first coding unit 1410 having a non-square shape, a height of which is longer than a width, a depth of the square second coding units 1412*a* and 1412*b* is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414*b* of a center location among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a predetermined location of each coding unit (e.g., an upper-left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the predetermined location are not limited to the above-described examples, and various PIDs and various locations and sizes of coding units may be used.

According to an embodiment, the image decoding apparatus 100 may use a predetermined data unit where a coding unit starts to be recursively split.

Figure 15:
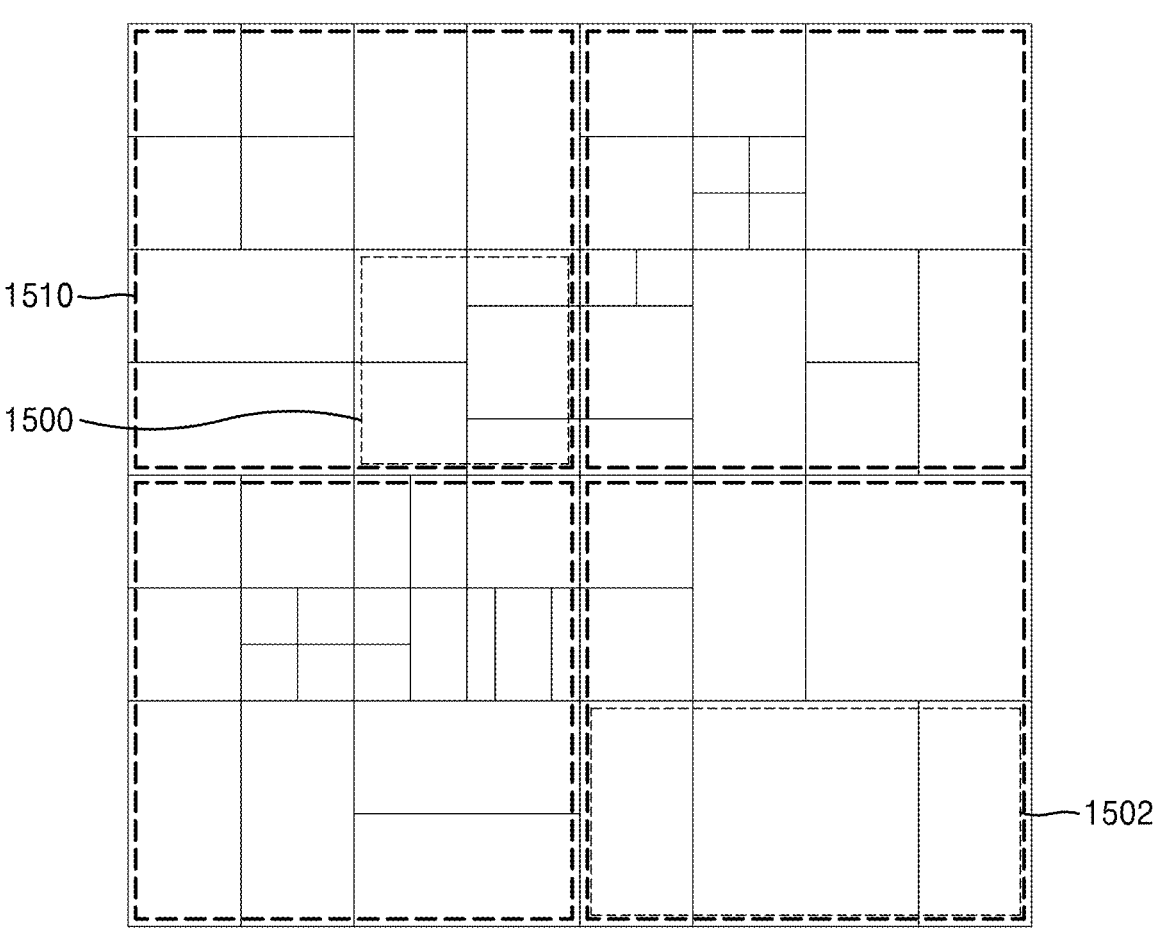
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the receiver 110 may obtain, from the bitstream, only the PID for identifying the size and shape of reference coding units with respect to each slice, slice segment, tile, tile group, or largest coding unit which is a data unit satisfying a predetermined condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
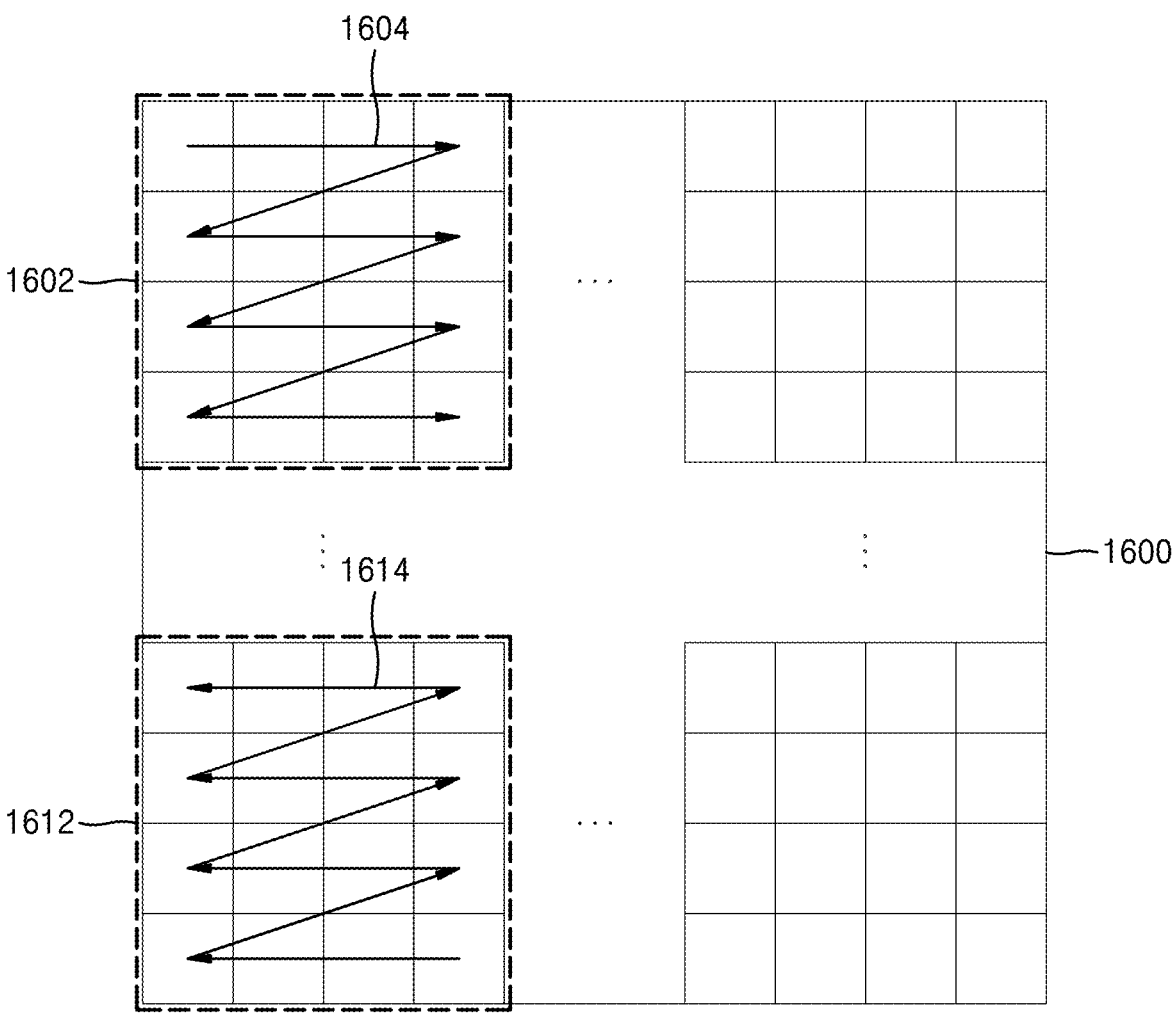
FIG. 16 illustrates a processing block serving as a unit for determining a determination order of reference coding units included in a picture, according to an embodiment.

FIG. 16 illustrates a processing block serving as a unit for determining a determination order of reference coding units included in a picture, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver 110 of the image decoding apparatus 100 may obtain the processing block size information from the bitstream according to each specific data unit. For example, the processing block size information may be obtained from the bitstream in a data unit such as an image, sequence, picture, slice, slice segment, tile, or tile group. That is, the receiver 110 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the receiver 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be predetermined between the image decoding apparatus 100 and the image encoding apparatus 2200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 2200 and the image decoding apparatus 100 may pre-determine to determine the split rule based on the block shape of the coding unit. However, the embodiment is not limited thereto. The image decoding apparatus 100 may determine the split rule based on the information obtained from the bitstream received from the image encoding apparatus 2200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule predetermined between the image encoding apparatus 2200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders is described above with reference to FIG. 12, details thereof are not provided again.

Hereinafter, a method and apparatus for encoding or decoding a video, according to an embodiment of the present specification, will be described with reference to FIGS. 17 to 20, the method and apparatus involving determining whether a slice including an adjacent pixel located at the upper-left or lower-right side of a current pixel from among adjacent pixels used for an ALF of the current pixel is different from a slice including the current pixel, when the slice including the adjacent pixel located at the upper-left or lower-right side is different from the slice including the current pixel, determining a value of the adjacent pixel located at the upper-left or lower-right side as a value of a closest pixel in a horizontal direction of the adjacent pixel located at the upper-left or lower-right side from among pixels included in the slice including the current pixel, determining an ALF including a filter coefficient for the current pixel and the adjacent pixels based on values of the current pixel and the adjacent pixels, correcting the value of the current pixel by using the values of the adjacent pixels, by applying the ALF to the current pixel, and encoding or decoding a current block including the current pixel.

Figure 17:
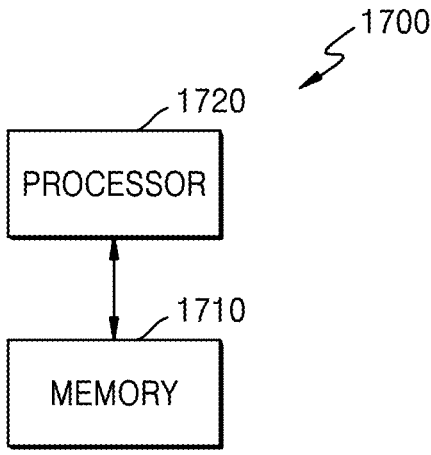
FIG. 17 is a block diagram of a video encoding apparatus according to an embodiment.

FIG. 17 is a block diagram of a video encoding apparatus according to an embodiment.

A video encoding apparatus 1700 according to an embodiment may include a memory 1710, and at least one processor 1720 connected to the memory 1710. Operations of the video encoding apparatus 1700 according to an embodiment may be performed by individual processors or under a control by a central processor. Also, the memory 1710 of the video encoding apparatus 1700 may store data received from the outside, data generated by a processor, for example, values of a current pixel and adjacent pixels, and a filter coefficient for the current pixel and the adjacent pixels, etc.

The processor 1720 of the video encoding apparatus 1700 may be configured to determine whether a slice including an adjacent pixel located at the upper-left or lower-right side of a current pixel from among adjacent pixels used for an ALF of the current pixel, is different from a slice including the current pixel, when the slice including the adjacent pixel located at the upper-left or lower-right side is different from the slice including the current pixel, determine a value of the adjacent pixel located at the upper-left or lower-right side as a value of a closest pixel in a horizontal direction of the adjacent pixel located at the upper-left or lower-right side from among pixels included in the slice including the current pixel, determine an ALF including a filter coefficient for the current pixel and the adjacent pixels based on a value of the current pixel and values of the adjacent pixels, correct the value of the current pixel by using the values of the adjacent pixels, by applying the ALF to the current pixel, and encode/decode a current block including the current pixel.

Hereinafter, detailed operations of a video encoding method, according to an embodiment, will be described below with reference to FIG. 18, in which the video encoding apparatus 1700 determines whether a slice including an adjacent pixel located at the upper-left or lower-right side of a current pixel from among adjacent pixels used for an ALF of the current pixel, is different from a slice including the current pixel, when the slice including the adjacent pixel located at the upper-left or lower-right side is different from the slice including the current pixel, determines a value of the adjacent pixel located at the upper-left or lower-right side as a value of a closest pixel in a horizontal direction of the adjacent pixel located at the upper-left or lower-right side from among pixels included in the slice including the current pixel, determines an ALF including a filter coefficient for the current pixel and the adjacent pixels based on a value of the current pixel and values of the adjacent pixels, corrects the value of the current pixel by using the values of the adjacent pixels, by applying the ALF to the current pixel, and encodes a current block including the current pixel.

FIG. 18 is a flowchart illustrating a video encoding method according to an embodiment.

Referring to FIG. 18, in operation S1810, the video encoding apparatus 1700 may determine whether a slice including an adjacent pixel located at the upper-left or lower-right side of a current pixel from among adjacent pixels used for an ALF of the current pixel, is different from a slice including the current pixel.

According to an embodiment, the current pixel may be a pixel to which deblocking filtering for removing a block effect and sample offset filtering for correcting a value of a pixel by using at least one of an edge offset and a band offset are applied.

In operation S1830, when the slice including the adjacent pixel located at the upper-left or lower-right side is different from the slice including the current pixel, the video encoding apparatus 1700 may determine a value of the adjacent pixel located at the upper-left or lower-right side as a value of a closest pixel in a horizontal direction of the adjacent pixel located at the upper-left or lower-right side from among pixels included in the slice including the current pixel.

According to an embodiment, if an adjacent pixel located at the upper side of the current pixel is located outside an upper boundary line of a slice including the current block, a value of the adjacent pixel located at the upper side of the current pixel may be determined as a value of a closest pixel in a vertical direction of the adjacent pixel located at the upper side from among pixels included in the current block, if an adjacent pixel located at the lower side of the current pixel is located outside a lower boundary line of the slice including the current block, a value of the adjacent pixel located at the lower side of the current pixel may be determined as a value of a closest pixel in a vertical direction of the adjacent pixel located at the lower side from among the pixels included in the current block, if an adjacent pixel located at the left side of the current pixel is located outside a left boundary line of the slice including the current block, a value of the adjacent pixel located at the left side of the current pixel may be determined as a value of a closest pixel in a horizontal direction of the adjacent pixel located at the left side from among the pixels included in the current block, and if an adjacent pixel located at the right side of the current pixel is located outside the right boundary line of the slice including the current block, a value of the adjacent pixel located at the right side of the current pixel may be determined as a value of a closest pixel in a horizontal direction of the adjacent pixel located at the right side from among the pixels included in the current block.

According to an embodiment, whether in-loop filtering is applicable by using adjacent pixels outside a boundary of a current slice may be determined by calculating a sum of transform difference (SATD) or a rate-distortion optimization (RDO), so that information indicating whether the in-loop filtering is applicable by using the adjacent pixels outside the boundary of the current slice may be encoded and signaled. if the in-loop filtering is applicable outside the boundary of the current slice, the in-loop filtering may be performed by using the adjacent pixels outside the boundary of the current slice.

According to an embodiment, if the in-loop filtering is not applicable by using the adjacent pixels outside the boundary of the current slice, and an adjacent pixel located at the left or right side is located outside the boundary of the current slice, a value of a left or right adjacent pixel outside the boundary of the current slice may be determined as a pixel value of a pixel within the boundary of the current slice at a closest location in a horizontal direction of the left or right adjacent pixel. Also, if in-loop filtering is not applicable by using the adjacent pixels outside the boundary of the current slice, and an adjacent pixel located at an upper or lower side is located outside the boundary of the current slice, a value of an upper or lower adjacent pixel outside the boundary of the current slice may be determined as a pixel value of a pixel within the boundary of the current slice at a closest location in a vertical direction of the upper or lower adjacent pixel.

According to an embodiment, if the in-loop filtering is not applicable by using the adjacent pixels outside the boundary of the current slice, and the current slice including the current pixel is different from a slice including an adjacent pixel located at the upper-left or lower-right side of the current pixel, a value of an adjacent pixel located at the upper-left or the lower-right side may be determined as a value of a closest pixel in a horizontal direction of the adjacent pixel located at the upper-left or lower-right side from among the pixels included in the slice including the current pixel.

According to an embodiment, if the adjacent pixel located at the upper side of the current pixel is located outside an upper boundary line of a tile including the current block, the value of the adjacent pixel located at the upper side of the current pixel may be determined as the value of the closest pixel in the vertical direction of the adjacent pixel located at the upper side from among the pixels included in the current block, if the adjacent pixel located at the lower side of the current pixel is located outside a lower boundary line of the tile including the current block, the value of the adjacent pixel located at the lower side of the current pixel may be determined as the value of the closest pixel in the vertical direction of the adjacent pixel located at the lower side from among the pixels included in the current block, if the adjacent pixel located at the left side of the current pixel is located outside a left boundary line of the tile including the current block, the value of the adjacent pixel located at the left side of the current pixel may be determined as the value of the closest pixel in the horizontal direction of the adjacent pixel located at the left side from among the pixels included in the current block, and if the adjacent pixel located at the right side of the current pixel is located outside a right boundary line of the tile including the current block, the value of the adjacent pixel located at the right side of the current pixel may be determined as the value of the closest pixel in the horizontal direction of the adjacent pixel located at the right side from among the pixels included in the current block.

According to an embodiment, whether in-loop filtering is applicable by using adjacent pixels outside a boundary of a current tile may be determined by calculating a SATD or a RDO, so that information indicating whether the in-loop filtering is applicable by using the adjacent pixels outside the boundary of the current tile may be encoded and signaled. If the in-loop filtering is applicable outside the boundary of the current tile, the in-loop filtering may be performed by using the adjacent pixels outside the boundary of the current tile.

According to an embodiment, if the in-loop filtering is not applicable by using the adjacent pixels outside the boundary of the current tile, and an adjacent pixel located at the left or right side is located outside the boundary of the current tile, a value of a left or right adjacent pixel outside the boundary of the current tile may be determined as a pixel value of a pixel within the boundary of the current tile at a closest location in a horizontal direction of the left or right adjacent pixel. Also, if in-loop filtering is not applicable by using the adjacent pixels outside the boundary of the current tile, and an adjacent pixel located at an upper or lower side is located outside the boundary of the current tile, a value of an upper or lower adjacent pixel outside the boundary of the current tile may be determined as a pixel value of a pixel within the boundary of the current tile at a closest location in a vertical direction of the upper or lower adjacent pixel.

According to an embodiment, if the adjacent pixel located at the upper side of the current pixel is located outside an upper boundary line of a subpicture including the current block, the value of the adjacent pixel located at the upper side of the current pixel may be determined as the value of the closest pixel in the vertical direction of the adjacent pixel located at the upper side from among the pixels included in the current block, if the adjacent pixel located at the lower side of the current pixel is located outside a lower boundary line of the subpicture including the current block, the value of the adjacent pixel located at the lower side of the current pixel may be determined as the value of the closest pixel in the vertical direction of the adjacent pixel located at the lower side from among the pixels included in the current block, if the adjacent pixel located at the left side of the current pixel is located outside a left boundary line of the subpicture including the current block, the value of the adjacent pixel located at the left side of the current pixel may be determined as the value of the closest pixel in the horizontal direction of the adjacent pixel located at the left side from among the pixels included in the current block, and if the adjacent pixel located at the right side of the current pixel is located outside a right boundary line of the subpicture including the current block, the value of the adjacent pixel located at the right side of the current pixel may be determined as the value of the closest pixel in the horizontal direction of the adjacent pixel located at the right side from among the pixels included in the current block.

According to an embodiment, whether in-loop filtering is applicable by using adjacent pixels outside a boundary of a current subpicture may be determined by calculating a SATD or a RDO, so that information indicating whether the in-loop filtering is applicable by using the adjacent pixels outside the boundary of the current subpicture may be encoded and signaled. If the in-loop filtering is applicable outside the boundary of the current subpicture, the in-loop filtering may be performed by using the adjacent pixels outside the boundary of the current tile.

According to an embodiment, if the in-loop filtering is not applicable by using the adjacent pixels outside the boundary of the current subpicture, and an adjacent pixel located at the left or right side is located outside the boundary of the current subpicture, a value of a left or right adjacent pixel outside the boundary of the current subpicture may be determined as a pixel value of a pixel within the boundary of the current subpicture at a closest location in a horizontal direction of the left or right adjacent pixel. Also, if the in-loop filtering is not applicable by using the adjacent pixels outside the boundary of the current subpicture, and an adjacent pixel located at an upper or lower side is located outside the boundary of the current subpicture, a value of an upper or lower adjacent pixel outside the boundary of the current subpicture may be determined as a pixel value of a pixel within the boundary of the current subpicture at a closest location in a vertical direction of the upper or lower adjacent pixel.

In operation S1850, the video encoding apparatus 1700 may determine an ALF including a filter coefficient for the current pixel and the adjacent pixels based on values of the current pixel and the adjacent pixels.

According to an embodiment, when the current block is a luma block, the ALF may be a 7×7 diamond-shaped filter.

According to an embodiment, when the current block is a chroma block, the ALF may be a 5×5 diamond-shaped filter.

According to an embodiment, the filter coefficient may be determined based on directionality and variance of the current pixel and of each adjacent pixel.

In operation S1870, the video encoding apparatus 1700 may correct the value of the current pixel by using the values of the adjacent pixels by applying the ALF to the current pixel.

According to an embodiment, the correcting of the value of the current pixel by using the values of the adjacent pixels may further include adding the value of the current pixel and a value obtained by multiplying a difference between the value of the current pixel and each of the values of the adjacent pixels by the filter coefficient.

In operation S1890, the video encoding apparatus 1700 may encode a current block including the current pixel.

Figure 19:
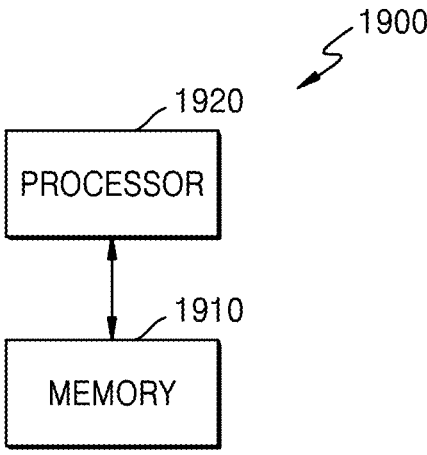
FIG. 19 illustrates a block diagram of the video decoding apparatus according to an embodiment.
Figure 20:
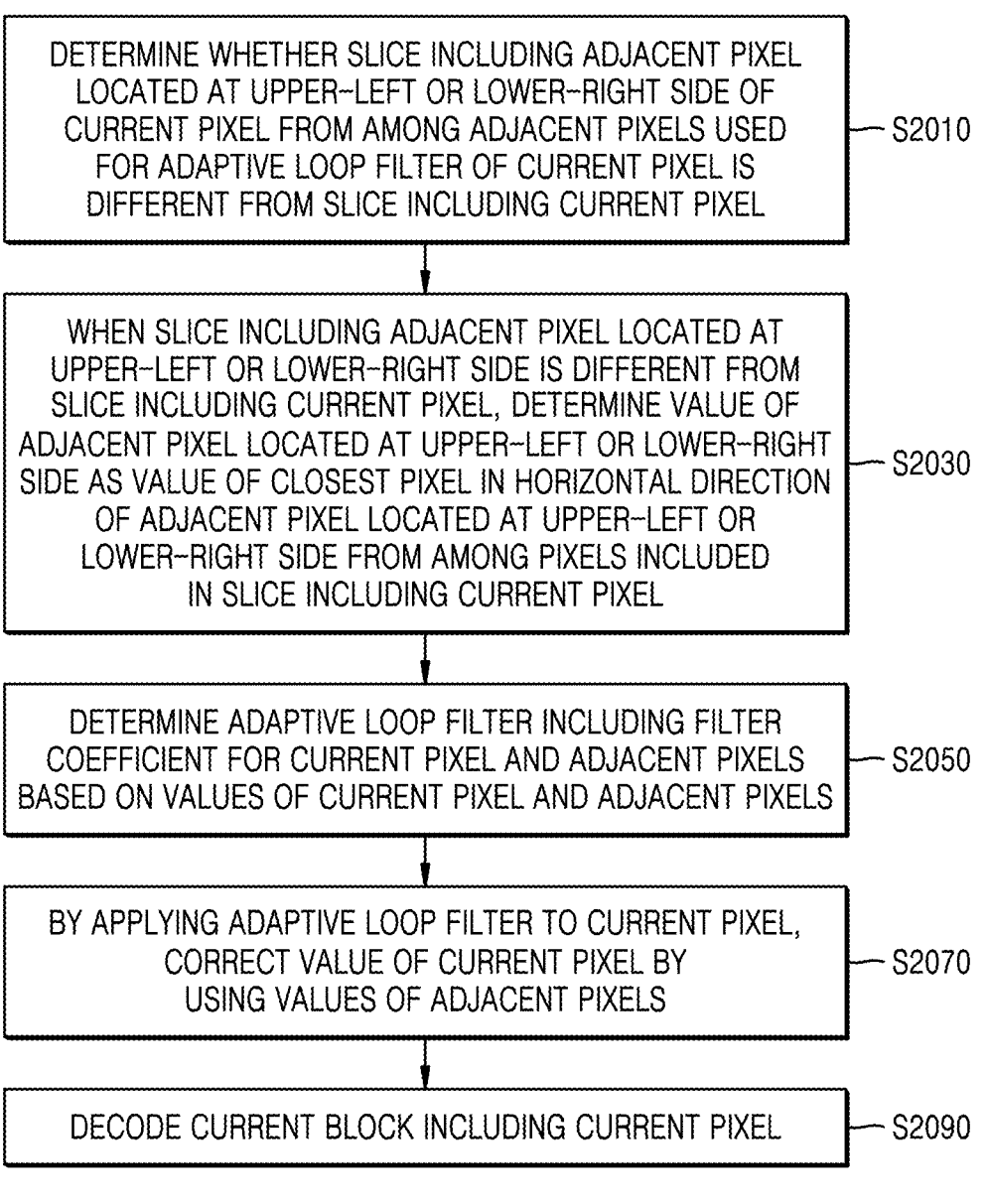
FIG. 20 illustrates a flowchart of the video decoding method according to an embodiment.

FIGS. 19 and 20 illustrate a block diagram of a video decoding apparatus according to an embodiment and a flowchart of a video decoding method according to an embodiment, respectively corresponding to the video encoding apparatus and the video encoding method described above.

FIG. 19 illustrates a block diagram of the video decoding apparatus according to an embodiment.

A video decoding apparatus 1900 according to an embodiment may include a memory 1910, and at least one processor 1920 connected to the memory 1910. Operations of the video decoding apparatus 1900 according to an embodiment may be performed by individual processors or under a control by a central processor. Also, the memory 1910 of the video decoding apparatus 1900 may store data received from the outside, data generated by a processor, for example, values of a current pixel and adjacent pixels, and a filter coefficient for the current pixel and the adjacent pixels, etc.

The processor 1920 of the video decoding apparatus 1900 may determine whether a slice including an adjacent pixel located at the upper-left or lower-right side of a current pixel from among adjacent pixels used for an ALF of the current pixel is different from a slice including the current pixel, when the slice including the adjacent pixel located at the upper-left or lower-right side is different from the slice including the current pixel, determine a value of the adjacent pixel located at the upper-left or lower-right side as a value of a closest pixel in a horizontal direction of the adjacent pixel located at the upper-left or lower-right side from among pixels included in the slice including the current pixel, determine an ALF including a filter coefficient for the current pixel and the adjacent pixels based on values of the current pixel and the adjacent pixels, correct the value of the current pixel by using the values of the adjacent pixels, by applying the ALF to the current pixel, and decode a current block including the current pixel.

Hereinafter, detailed operations of a video decoding method, according to an embodiment, will be described below with reference to FIG. 20, in which the video decoding apparatus 1900 determines whether a slice including an adjacent pixel located at the upper-left or lower-right side of a current pixel from among adjacent pixels used for an ALF of the current pixel is different from a slice including the current pixel, when the slice including the adjacent pixel located at the upper-left or lower-right side is different from the slice including the current pixel, determines a value of the adjacent pixel located at the upper-left or lower-right side as a value of a closest pixel in a horizontal direction of the adjacent pixel located at the upper-left or lower-right side from among pixels included in the slice including the current pixel, determines an ALF including a filter coefficient for the current pixel and the adjacent pixels based on values of the current pixel and the adjacent pixels, corrects the value of the current pixel by using the values of the adjacent pixels, by applying the ALF to the current pixel, and decodes a current block including the current pixel.

FIG. 20 illustrates a flowchart of the video decoding method according to an embodiment.

Referring to FIG. 20, in operation S2010, the video decoding apparatus 1900 may determine whether a slice including an adjacent pixel located at the upper-left or lower-right side of a current pixel from among adjacent pixels used for an ALF of the current pixel is different from a slice including the current pixel.

According to an embodiment, the current pixel may be a pixel to which deblocking filtering for removing a block effect and sample offset filtering for correcting a value of a pixel by using at least one of an edge offset and a band offset are applied.

In operation S2030, when the slice including the adjacent pixel located at the upper-left or lower-right side is different from the slice including the current pixel, the video decoding apparatus 1900 may determine a value of the adjacent pixel located at the upper-left or lower-right side as a value of a closest pixel in a horizontal direction of the adjacent pixel located at the upper-left or lower-right side from among pixels included in the slice including the current pixel.

According to an embodiment, if an adjacent pixel located at the upper side of the current pixel is located outside an upper boundary line of a slice including the current block, a value of the adjacent pixel located at the upper side of the current pixel may be determined as a value of a closest pixel in a vertical direction of the adjacent pixel located at the upper side from among pixels included in the current block, if an adjacent pixel located at the lower side of the current pixel is located outside a lower boundary line of the slice including the current block, a value of the adjacent pixel located at the lower side of the current pixel may be determined as a value of a closest pixel in a vertical direction of the adjacent pixel located at the lower side from among the pixels included in the current block, if an adjacent pixel located at the left side of the current pixel is located outside a left boundary line of the slice including the current block, a value of the adjacent pixel located at the left side of the current pixel may be determined as a value of a closest pixel in a horizontal direction of the adjacent pixel located at the left side from among the pixels included in the current block, and if an adjacent pixel located at the right side of the current pixel is located outside a right boundary line of the slice including the current block, a value of the adjacent pixel located at the right side of the current pixel may be determined as a value of a closest pixel in a horizontal direction of the adjacent pixel located at the right side from among the pixels included in the current block.

According to an embodiment, information indicating whether in-loop filtering is applicable by using adjacent pixels outside a boundary of a current slice may be obtained from a bitstream, and if the information indicates that in-loop filtering is applicable, the in-loop filtering may be performed by using the adjacent pixels outside the boundary of the current slice.

According to an embodiment, if the information indicating whether in-loop filtering is applicable by using the adjacent pixels outside the boundary of the current slice indicates that the in-loop filtering is not applicable, the information being obtained from the bitstream, and an adjacent pixel located at the left or right side is located outside the boundary of the current slice, a value of a left or right adjacent pixel outside the boundary of the current slice may be determined as a pixel value of a pixel within the boundary of the current slice at a closest location in a horizontal direction of the left or right adjacent pixel. Also, if the information indicating whether in-loop filtering is applicable by using the adjacent pixels outside the boundary of the current slice indicates that in-loop filtering is not applicable, and an adjacent pixel located at an upper or lower side is located outside the boundary of the current slice, a value of an upper or lower adjacent pixel outside the boundary of the current slice may be determined as a pixel value of a pixel within the boundary of the current slice at a closest location in a vertical direction of the upper or lower adjacent pixel.

According to an embodiment, if the information indicating whether in-loop filtering is applicable by using the adjacent pixels outside the boundary of the current slice indicates that in-loop filtering is not applicable, and the current slice including the current pixel is different from a slice including an adjacent pixel located at the upper-left or lower-right side of the current pixel, a value of the adjacent pixel located at the upper-left or lower-right side may be determined as a value of a closest pixel in a horizontal direction of the adjacent pixel located at the upper-left or lower-right side from among the pixels included in the slice including the current pixel.

According to an embodiment, if the adjacent pixel located at the upper side of the current pixel is located outside an upper boundary line of a tile including the current block, the value of the adjacent pixel located at the upper side of the current pixel may be determined as the value of the closest pixel in the vertical direction of the adjacent pixel located at the upper side from among the pixels included in the current block, if the adjacent pixel located at the lower side of the current pixel is located outside a lower boundary line of the tile including the current block, the value of the adjacent pixel located at the lower side of the current pixel may be determined as the value of the closest pixel in the vertical direction of the adjacent pixel located at the lower side from among the pixels included in the current block, if the adjacent pixel located at the left side of the current pixel is located outside a left boundary line of the tile including the current block, the value of the adjacent pixel located at the left side of the current pixel may be determined as the value of the closest pixel in the horizontal direction of the adjacent pixel located at the left side from among the pixels included in the current block, and if the adjacent pixel located at the right side of the current pixel is located outside a right boundary line of the tile including the current block, the value of the adjacent pixel located at the right side of the current pixel may be determined as the value of the closest pixel in the horizontal direction of the adjacent pixel located at the right side from among the pixels included in the current block.

According to an embodiment, information indicating whether in-loop filtering is applicable by using adjacent pixels outside a boundary of a current tile may be obtained from a bitstream, and if the information indicates that in-loop filtering is applicable, the in-loop filtering may be performed by using the adjacent pixels outside the boundary of the current tile.

According to an embodiment, if the information indicating whether in-loop filtering is applicable by using the adjacent pixels outside the boundary of the current tile indicates that the in-loop filtering is not applicable, the information being obtained from the bitstream, and an adjacent pixel located at the left or right side is located outside the boundary of the current tile, a value of a left or right adjacent pixel outside the boundary of the current tile may be determined as a pixel value of a pixel within the boundary of the current tile at a closest location in a horizontal direction of the left or right adjacent pixel. Also, if the information indicating whether in-loop filtering is applicable by using the adjacent pixels outside the boundary of the current tile indicates that in-loop filtering is not applicable, and an adjacent pixel located at an upper or lower side is located outside the boundary of the current tile, a value of an upper or lower adjacent pixel outside the boundary of the current tile may be determined as a pixel value of a pixel within the boundary of the current tile at a closest location in a vertical direction of the upper or lower adjacent pixel.

According to an embodiment, if the adjacent pixel located at the upper side of the current pixel is located outside an upper boundary line of a subpicture including the current block, the value of the adjacent pixel located at the upper side of the current pixel may be determined as the value of the closest pixel in the vertical direction of the adjacent pixel located at the upper side from among the pixels included in the current block, if the adjacent pixel located at the lower side of the current pixel is located outside a lower boundary line of the subpicture including the current block, the value of the adjacent pixel located at the lower side of the current pixel may be determined as the value of the closest pixel in the vertical direction of the adjacent pixel located at the lower side from among the pixels included in the current block, if the adjacent pixel located at the left side of the current pixel is located outside a left boundary line of the subpicture including the current block, the value of the adjacent pixel located at the left side of the current pixel may be determined as the value of the closest pixel in the horizontal direction of the adjacent pixel located at the left side from among the pixels included in the current block, and if the adjacent pixel located at the right side of the current pixel is located outside a right boundary line of the subpicture including the current block, the value of the adjacent pixel located at the right side of the current pixel may be determined as the value of the closest pixel in the horizontal direction of the adjacent pixel located at the right side from among the pixels included in the current block.

According to an embodiment, information indicating whether in-loop filtering is applicable by using adjacent pixels outside a boundary of a current subpicture may be obtained from a bitstream, and if the information indicates that in-loop filtering is applicable, the in-loop filtering may be performed by using the adjacent pixels outside the boundary of the current subpicture.

According to an embodiment, if the information indicating whether in-loop filtering is applicable by using the adjacent pixels outside the boundary of the current subpicture indicates that the in-loop filtering is not applicable, the information being obtained from the bitstream, and an adjacent pixel located at the left or right side is located outside the boundary of the current subpicture, a value of a left or right adjacent pixel outside the boundary of the current subpicture may be determined as a pixel value of a pixel within the boundary of the current subpicture at a closest location in a horizontal direction of the left or right adjacent pixel. Also, if the information indicating whether in-loop filtering is applicable by using the adjacent pixels outside the boundary of the current subpicture indicates that in-loop filtering is not applicable, and an adjacent pixel located at an upper or lower side is located outside the boundary of the current subpicture, a value of an upper or lower adjacent pixel outside the boundary of the current subpicture may be determined as a pixel value of a pixel within the boundary of the current subpicture at a closest location in a vertical direction of the upper or lower adjacent pixel.

In operation S2050, the video decoding apparatus 1900 may determine an ALF including a filter coefficient for the current pixel and the adjacent pixels based on values of the current pixel and the adjacent pixels.

According to an embodiment, when the current block is a luma block, the ALF may be a 7×7 diamond-shaped filter.

According to an embodiment, when the current block is a chroma block, the ALF may be a 5×5 diamond-shaped filter.

According to an embodiment, the filter coefficient may be determined based on directionality and variance of the current pixel and each adjacent pixel.

In operation S2070, the video decoding apparatus 1900 may correct the value of the current pixel by using the values of the adjacent pixels, by applying the ALF to the current pixel.

According to an embodiment, the correcting of the value of the current pixel by using the values of the adjacent pixels may further include adding the value of the current pixel and a value obtained by multiplying a difference between the value of the current pixel and each of the values of the adjacent pixels by the filter coefficient.

In operation S2090, the video decoding apparatus 1900 may decode a current block including the current pixel.

Figure 21:
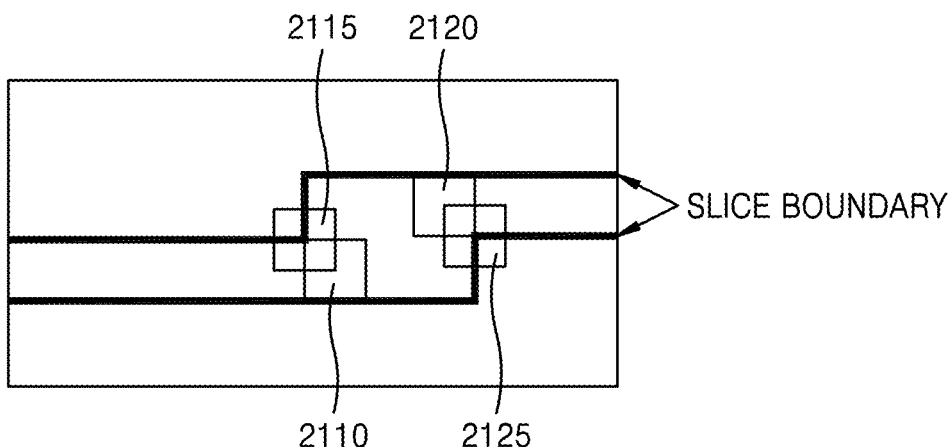
FIG. 21 is a diagram for describing filtering at a slice boundary in a raster scan order, according to an embodiment.

FIG. 21 is a diagram for describing filtering at a slice boundary in a raster scan order, according to an embodiment.

Referring to FIG. 21, when filtering is performed on a first block 2110 and a second block 2120, which are included in the slice in the raster scan order, filtering areas may be outside of the slice boundary. For example, when filtering is performed on a pixel included in the first block 2110, an upper-left area of the filtering area 2115 for the pixel in the first block 2110 may be outside of a boundary of a slice including a first pixel 2110, and when filtering is performed on a pixel included in the second block 2120, a lower-right area of the filtering area 2125 for the pixel in the second block 2120 may be outside of a boundary of a slice including a second pixel 2120. It is necessary to perform filtering by padding an area outside the slice boundary in the filtering areas with a pixel adjacent to the slice boundary instead of a pixel outside the slice boundary. A pixel padding method in this case will be described below with reference to FIG. 22.

Figure 22:
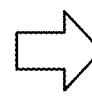
FIG. 22 is a diagram for describing pixel padding for an upper-left area of a filtering area at a slice boundary in a raster scan order, according to an embodiment.

FIG. 22 is a diagram for describing pixel padding for an upper-left area of a filtering area at a slice boundary in a raster scan order, according to an embodiment.

Referring to FIG. 22, among blocks A, B, C, and D included in the filtering area, when it is assumed that the block A is outside the slice boundary and the blocks B, C, and D are within the slice boundary, pixels A0, A1, A2, and A3 in the block A outside a slice area are pixels outside the slice boundary, so that pixel padding is performed. For example, the pixels A0 and A1 may be padded with a value of a pixel B0 closest in a horizontal direction at the slice boundary, and the pixels A2 and A3 may be padded with a value of a pixel B3 horizontally closest in a horizontal direction at the slice boundary.

As another example, the pixels A0 and A2 may be padded with a value of a pixel C0 closest in a vertical direction at the slice boundary, and the pixels A1 and A3 may be padded with a value of a pixel C1 closest in a vertical direction at the slice boundary.

Alternatively, padding may be performed with adjacent pixels in the blocks B, C, and D based on a pixel distance. In detail, the pixel A0 may be padded with one of a pixel value of the pixel B0, a pixel value of the pixel C0, and a pixel value of (B0+C0+1)/2, the pixel A1 may be padded with the pixel value of the pixel B0, the pixel A2 may be padded with the pixel value of the pixel C0, and the pixel A3 may be padded with one of a pixel value of the pixel B3, a pixel value of the pixel C1, a pixel value of a pixel D0, and a pixel value of (B3+C1+1)/2.

As another example, padding may be performed with an average value of a representative value of the block B and a representative value of the block C. In detail, pixel values of all pixels in the block A may be padded with (B3+C1+1)/2 by using the pixel B3 in the block B and the pixel C1 in the block C.

As another example, padding may be performed with an average value of representative values of the blocks B, C, and D. In detail, the pixel values of all the pixels in the block A may be padded with (B3+C1+2*D0+2)/4 by using the pixel B3 in the block B, the pixel C1 in the block C, and the pixel D0 in the block D.

As another example, padding may be performed on a block A area by using planar mode algorithm in intra prediction.

Alternatively, the block A area may be padded by using the pixel D0. That is, all the pixels in the block A may be padded with the pixel value of the pixel D0.

As another example, the block A area may be padded with an average of pixel values of pixels adjacent to pixels in the block A area in x-coordinate and y-coordinate directions. In detail, the pixel A0 may be padded with a value of (C0+B0)/2, the pixel A1 may be padded with a value of (C1+B0)/2, the pixel A2 may be padded with a value of (C0+B3)/2, and the pixel A3 may be padded with a value of (C1+B3)/2.

As another example, the block A area may be padded with a specific value. In detail, pixel values of the block A area may be padded with an intermediate bit-depth value (e.g., 512 in the case of 10 bits).

As another example, the pixels in the block A area may be padded with an average value of all pixels in the blocks B, C, and D.

Alternatively, when whether to use a dependent slice is set and transmitted in units of sequence parameter sets (SPSs), picture parameter sets (PPSs), slices, and tiles, even though the slice boundary is a dependent slice, padding may be performed on pixels in an area (block A) outside the slice boundary by using pixels within the slice boundary.

As another example, the pixels outside the slice boundary may be clipped and not used for filtering. In detail, among the pixels A3, B3, C1, and D0, the pixel A3 is located outside the slice boundary, so that filtering may be performed by using the pixels B3, C1, and D0 other than the pixel A3.

The padding methods described above with reference to FIG. 22 may be applied to all loop filtering methods that perform diagonal filtering or two-dimensional filtering as well as adaptive loop filtering.

Figure 23:
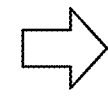
FIG. 23 is a diagram for describing pixel padding for a lower-right area of a filtering area at a slice boundary in a raster scan order, according to an embodiment.

FIG. 23 is a diagram for describing pixel padding for a lower-right area of a filtering area at a slice boundary in a raster scan order, according to an embodiment.

Referring to FIG. 23, among blocks A, B, C, and D included in the filtering area, when it is assumed that the block D is outside the slice boundary and the blocks A, B, and C are within the slice boundary, pixels D0, D1, D2, and D3 in the block D outside a slice area are pixels outside the slice boundary, so that pixel padding is performed. For example, the pixels D0 and D1 may be padded with a value of a pixel C2 closest in a horizontal direction at the slice boundary, and the pixels D2 and D3 may be padded with a value of a pixel C5 closest in a horizontal direction at the slice boundary.

As another example, the pixels D0 and D2 may be padded with a value of a pixel B4 closest in a vertical direction at the slice boundary, and the pixels D1 and D3 may be padded with a value of a pixel B5 closest in a vertical direction at the slice boundary.

In addition, the methods of other examples described above with reference to FIG. 22 may be applied to the block D. A detailed process thereof may be a method corresponding to one of the methods described above with reference to FIG. 22 and thus will be omitted.

Figure 24:
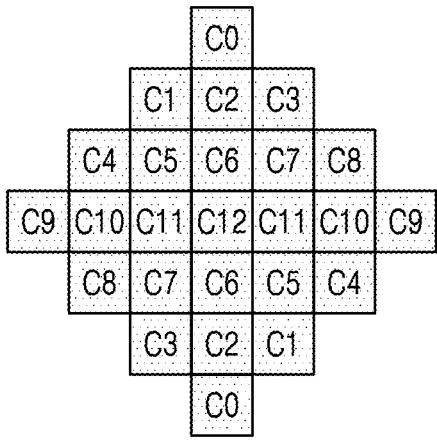
FIG. 24 illustrates a filter including filter coefficients of an adaptive loop filter for a current pixel of a luma block.

FIG. 24 illustrates a filter including filter coefficients of an ALF for a current pixel of a luma block.

In the filter illustrated in FIG. 24, indexes from C0 to C12 indicate respective filter coefficients, and the respective filter coefficients correspond to respective pixels according to arrangement positions of the filter coefficients. The filter in FIG. 24 corrects a pixel value of a current pixel corresponding to an index C12 by using adjacent pixels corresponding to the filter coefficients. For example, the pixel value of the current pixel corresponding to the index C12 may be corrected by adding the pixel value of the current pixel corresponding to the index C12 and a pixel correction value, the pixel correction value being generated by adding all of a calculated value calculated by using a difference between the current pixel and an adjacent pixel corresponding to an index C0 at the top and a filter coefficient corresponding to the index C0 at the top, a calculated value calculated by using a difference between the current pixel and an adjacent pixel corresponding to an index C1 at the upper left and a filter coefficient corresponding to the index C1 at the upper left, . . . , and a calculated value calculated by using a difference between the current pixel and an adjacent pixel corresponding to an index C0 at the bottom and a filter coefficient corresponding to the index C0 at the bottom.

A filter coefficient for an ALF may be determined so that a pixel value of a specific block of a reconstructed image does not have a largest difference from a pixel value of an original image.

Figure 25:
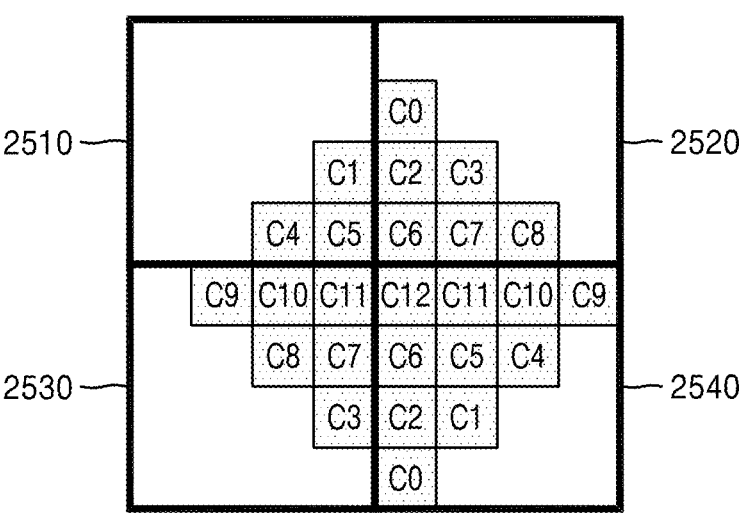
FIG. 25 is a diagram for describing a method of padding an upper-left adjacent pixel located outside a slice boundary when an adaptive loop filter is applied to a current pixel of a luma block.

FIG. 25 is a diagram for describing a method of padding an upper-left adjacent pixel located outside a slice boundary when an ALF is applied to a current pixel of a luma block.

Referring to FIG. 25, when an ALF is applied to a current luma pixel at a location corresponding to an index C12, an upper area 2520 and a left area 2530 of an area 2540 including the current luma pixel may be included in the same slice, and an upper-left area 2510 may be included in a slice different from the area 2540 including the current luma pixel. In this case, adjacent pixels respectively corresponding to indexes C1, C4, and C5 included in the upper-left area 2510 need to be padded. In detail, the adjacent pixel corresponding to the index C1 included in the upper-left area 2510 may be padded with a pixel value of a pixel corresponding to an index C2 included in the upper area 2520, which is a closest pixel in a horizontal direction, and the adjacent pixels corresponding to the indexes C4 and C5 included in the upper-left area 2510 may be padded with a pixel value of a pixel corresponding to an index C6 included in the upper area 2520, which is a closest pixel in a horizontal direction.

After a slice including the current pixel and adjacent pixels included in another slice are padded, an ALF including a filter coefficient may be determined based on the current pixel and the adjacent pixels, and a pixel value of the current pixel may be corrected by applying the ALF to the current pixel.

Figure 26:
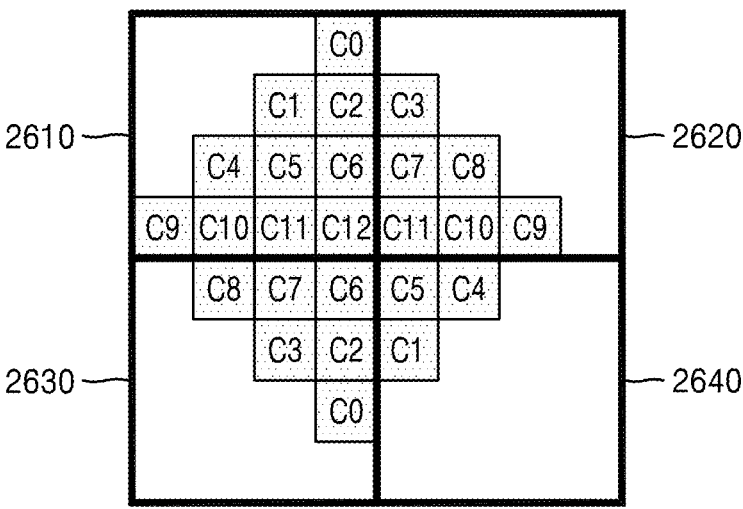
FIG. 26 is a diagram for describing a method of padding a lower-right adjacent pixel located outside a slice boundary when an adaptive loop filter is applied to a current pixel of a luma block.

FIG. 26 is a diagram for describing a method of padding a lower-right adjacent pixel located outside a slice boundary when an ALF is applied to a current pixel of a luma block.

Referring to FIG. 26, when an ALF is applied to a current luma pixel at a location corresponding to an index C12, a right area 2620 and a lower area 2630 of an area 2610 including the current luma pixel may be included in the same slice, and a lower-right area 2640 may be included in a slice different from the area 2610 including the current luma pixel. In this case, adjacent pixels corresponding to indexes C5, C4, and C1 included in the lower-right area 2640 need to be padded. In detail, adjacent pixels corresponding to the indexes C5 and C4 included in the lower-right area 2640 may be padded with a pixel value of a pixel corresponding to an index C6 included in the lower area 2630, which is a closest pixel in a horizontal direction, and the adjacent pixels corresponding to the index C1 included in the lower-right area 2640 may be padded with a pixel value of a pixel corresponding to an index C2 included in the lower area 2630, which is a closest pixel in a horizontal direction.

After a slice including the current pixel and adjacent pixels included in another slice are padded, an ALF including a filter coefficient may be determined based on the current pixel and the adjacent pixels, and a pixel value of the current pixel may be corrected by applying the ALF to the current pixel.

Figure 27:
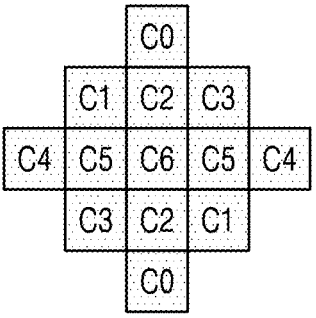
FIG. 27 illustrates a filter including filter coefficients of an adaptive loop filter for a current pixel of a chroma block.

FIG. 27 illustrates a filter including filter coefficients of an ALF for a current pixel of a chroma block.

In the filter illustrated in FIG. 27, indexes from C0 to C6 indicate respective filter coefficients, and the respective filter coefficients correspond to respective pixels according to arrangement positions of the filter coefficients. The filter in FIG. 27 corrects a pixel value of a current pixel corresponding to an index C6 by using adjacent pixels corresponding to the filter coefficients. For example, the pixel value of the current pixel corresponding to the index C6 may be corrected by adding the pixel value of the current pixel corresponding to the index C6 and a pixel correction value, the pixel correction value being generated by adding all of a calculated value calculated by using a difference between the current pixel and an adjacent pixel corresponding to an index C0 at the top and a filter coefficient corresponding to the index C0 at the top, a calculated value calculated by using a difference between the current pixel and an adjacent pixel corresponding to an index C1 at the upper left and a filter coefficient corresponding to the index C1 at the upper left, . . . , and a calculated value calculated by using a difference between the current pixel and an adjacent pixel corresponding to an index C0 at the bottom and a filter coefficient corresponding to the index C0 at the bottom.

Figure 28:
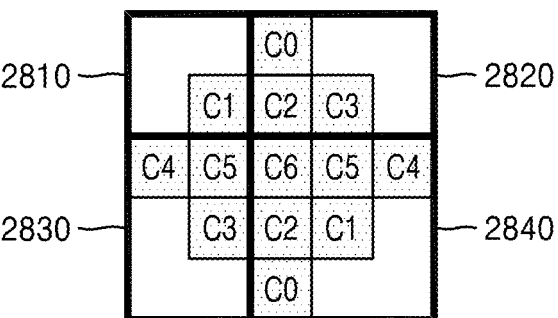
FIG. 28 is a diagram for describing a method of padding an upper-left adjacent pixel located outside a slice boundary when an adaptive loop filter is applied to a current pixel of a chroma block.

FIG. 28 is a diagram for describing a method of padding an upper-left adjacent pixel located outside a slice boundary when an ALF is applied to a current pixel of a chroma block.

Referring to FIG. 28, when an ALF is applied to a current chroma pixel at a location corresponding to an index C6, an upper area 2820 and a left area 2830 of an area 2840 including the current chroma pixel may be included in the same slice, and an upper-left area 2810 may be included in a slice different from the area 2840 including the current chroma pixel. In this case, an adjacent pixel corresponding to an index C1 included in the upper-left area 2810 needs to be padded. In detail, the adjacent pixel corresponding to the index C1 included in the upper-left area 2810 may be padded with a pixel value of a pixel corresponding to an index C2 included in the upper area 2820, which is a closest pixel in a horizontal direction.

After a slice including the current pixel and adjacent pixels included in another slice are padded, an ALF including a filter coefficient may be determined based on the current pixel and the adjacent pixels, and a pixel value of the current pixel may be corrected by applying the ALF to the current pixel.

Figure 29:
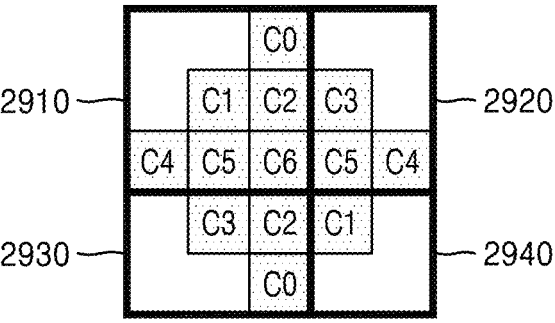
FIG. 29 is a diagram for describing a method of padding a lower-right adjacent pixel located outside a slice boundary when an adaptive loop filter is applied to a current pixel of a chroma block.

FIG. 29 is a diagram for describing a method of padding a lower-right adjacent pixel located outside a slice boundary when an ALF is applied to a current pixel of a chroma block.

Referring to FIG. 29, when an ALF is applied to a current chroma pixel at a location corresponding to an index C6, a right area 2920 and a lower area 2930 of an area 2910 including the current chroma pixel may be included in the same slice, and a lower-right area 2940 may be included in a slice different from the area 2910 including the current chroma pixel. In this case, an adjacent pixel corresponding to an index C1 included in the lower-right area 2940 needs to be padded. In detail, the adjacent pixel corresponding to the index C1 included in the lower-right area 2940 may be padded with a pixel value of a pixel corresponding to an index C2 included in the lower area 2930, which is a closest pixel in a horizontal direction.

After a slice including the current pixel and adjacent pixels included in another slice are padded, an ALF including a filter coefficient may be determined based on the current pixel and the adjacent pixels, and a pixel value of the current pixel may be corrected by applying the ALF to the current pixel.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

Moreover, the aforedescribed embodiments of the disclosure can be written as a program executable on a computer, and can be implemented in general-use digital computers that execute the program by using a computer-readable recording medium. Examples of the computer-readable recording medium include magnetic storage media (e.g., ROM, floppy disks, hard disks, etc.), optical recording media (e.g., compact disc ROMs (CD-ROMs), or digital versatile discs (DVDs), or the like.

The invention claimed is:

1. A video decoding method comprising:
reconstructing a current block comprising a current pixel via a prediction and an inverse transformation;
obtaining, from a bitstream, information indicating whether an in-loop filtering by using at least one pixel located outside a boundary of a current slice is applicable;
when a slice comprising a first adjacent pixel located at an upper-left side of the current pixel is different from the current slice comprising the current pixel, and the information indicates that the in-loop filtering by using the at least one pixel located outside the boundary of the current slice is not applicable, padding a value of the first adjacent pixel as a value of a second adjacent pixel, from among pixels located in the current slice, at a closest location to a location of the first adjacent pixel in a horizontal direction of the location of the first adjacent pixel;
determining filter coefficients corresponding to locations of third adjacent pixels used for an adaptive loop filter (ALF) of the current pixel based on a value of the current pixel and values of the third adjacent pixels, wherein the third adjacent pixels include the first adjacent pixel and the locations of the third adjacent pixels are predetermined; and
obtaining a value of a filtered current pixel by adding the value of the current pixel and a value obtained by applying a filter coefficient from among the filter coefficients to a difference between a value of one adjacent pixel from among the third adjacent pixels and the value of the current pixel,
wherein when two adjacent pixels among the third adjacent pixels are symmetrically located horizontally relative to the current pixel, filter coefficients corresponding to locations of the two adjacent pixels are same.

2. A video encoding method comprising:
reconstructing a current block comprising a current pixel via a prediction and an inverse transformation;
generating information indicating whether an in-loop filtering by using at least one pixel located outside a boundary of a current slice is applicable;
when a slice comprising a first adjacent pixel located at an upper-left side of the current pixel is different from the current slice comprising the current pixel, and the information indicates that the in-loop filtering by using the at least one pixel located outside the boundary of the current slice is not applicable, padding a value of the first adjacent pixel as a value of a second adjacent pixel, from among pixels located in the current slice, at a closest location to a location of the first adjacent pixel in a horizontal direction of the location of the first adjacent pixel;
determining filter coefficients corresponding to locations of third adjacent pixels used for an adaptive loop filter (ALF) of the current pixel based on a value of the current pixel and values of the third adjacent pixels, wherein the third adjacent pixels comprise the first adjacent pixel and the locations of the third adjacent pixels are predetermined; and
obtaining a value of a filtered current pixel by adding the value of the current pixel and a value obtained by applying a filter coefficient from among the filter coefficients to a difference between a value of one adjacent pixel from among the third adjacent pixels and the value of the current pixel,
wherein when two adjacent pixels among the third adjacent pixels are symmetrically located horizontally relative to the current pixel, filter coefficients corresponding to locations of the two adjacent pixels are same.

3. An apparatus comprising at least one processor configured to transmit a bitstream generated according to the video encoding method of claim 2.

4. A method for transmitting a bitstream, the method comprising:
generating the bitstream by the video encoding method of claim 2, and
transmitting the bitstream to a receiver.

* * * * *